(12) United States Patent
Hauger et al.

(10) Patent No.: US 7,180,660 B2
(45) Date of Patent: Feb. 20, 2007

(54) STEREO-EXAMINATION SYSTEMS AND STEREO-IMAGE GENERATION APPARATUS AS WELL AS A METHOD FOR OPERATING THE SAME

(75) Inventors: Christoph Hauger, Aalen (DE); Michael Haisch, Aalen (DE); Andreas Obrebski, Düsseldorf (DE)

(73) Assignee: Carl-Zeiss-Stiftung Trading as Carl Zeiss, Heidenheim (DE)

( * ) Notice: Subject to any disclaimer, the term of this patent is extended or adjusted under 35 U.S.C. 154(b) by 21 days.

(21) Appl. No.: 10/357,260

(22) Filed: Feb. 3, 2003

(65) Prior Publication Data
US 2004/0017607 A1    Jan. 29, 2004

(30) Foreign Application Priority Data
Feb. 4, 2002  (DE) ............................... 102 04 431
Jan. 13, 2003 (DE) ............................... 103 00 925

(51) Int. Cl.
G02B 21/22       (2006.01)
(52) U.S. Cl. ..................................... 359/378; 359/363
(58) Field of Classification Search ................ 359/363, 359/368, 369, 372–378
See application file for complete search history.

(56) References Cited

U.S. PATENT DOCUMENTS

| | | | |
|---|---|---|---|
| 3,574,295 A | 4/1971 | Tasaki | 95/18 |
| 3,818,125 A | 6/1974 | Butterfield | 178/6.5 |
| 4,143,938 A | 3/1979 | Feinbloom | 350/19 |
| 4,272,161 A | 6/1981 | Feinbloom | 350/320 |
| 4,640,588 A * | 2/1987 | Tanaka | 359/377 |
| 5,067,804 A | 11/1991 | Kitajima et al. | 359/369 |
| 5,122,650 A | 6/1992 | McKinley | 250/208.1 |
| 5,191,203 A | 3/1993 | McKinley | 250/208.1 |
| 5,345,087 A | 9/1994 | Luber et al. | 250/561 |
| 5,552,929 A | 9/1996 | Fukaya et al. | 359/380 |
| 5,588,948 A | 12/1996 | Takahashi | |
| 5,805,205 A | 9/1998 | Songer | 348/49 |
| 5,835,264 A | 11/1998 | Tandler et al. | 359/377 |
| 5,835,266 A | 11/1998 | Kitajima | 359/384 |
| 5,856,883 A | 1/1999 | Sander | 359/389 |

(Continued)

FOREIGN PATENT DOCUMENTS

DE    42 12 924 A1    1/1993

(Continued)

*Primary Examiner*—Mark A. Robinson
(74) *Attorney, Agent, or Firm*—Osha Liang L.L.P.

(57) ABSTRACT

A stereo-examination system for imaging an object 8 is proposed, comprising an objective arrangement 3 having an optical axis 5 and an object plane 7 for positioning the object 8 to be imaged, wherein the objective arrangement 3 receives an object-side beam bundle 11 emanating from the object plane 7 into a solid angle region 9 and converts the same into an image-side beam bundle 13, a selection arrangement for selecting at least a pair of partial beam bundles 19, 20 from the image-side beam bundle 13, and an image transmission apparatus 51, 52 for generating a representation of images of the object 8 provided by the partial beam bundles 19, 20.

The stereo-examination system is distinguished in that the selection arrangement is provided for displacing a beam cross-section of at least one of the two partial beam bundles 19, 20 relative to a beam cross-section of the image-side beam bundle 13, a controller 49 being provided for controlling the selection arrangement to displace the beam cross-section of the at least one partial beam bundle 19, 20 in circumferential direction about the optical axis 5.

21 Claims, 24 Drawing Sheets

U.S. PATENT DOCUMENTS

| | | | |
|---|---|---|---|
| 5,867,210 A | 2/1999 | Rod | 348/51 |
| 5,867,309 A | 2/1999 | Spink et al. | 359/377 |
| 5,886,675 A | 3/1999 | Aye et al. | 345/7 |
| 5,898,518 A | 4/1999 | Biber | 359/385 |
| 5,912,763 A * | 6/1999 | Spink | 359/363 |
| 5,914,810 A | 6/1999 | Watts | 359/464 |
| 6,133,945 A | 10/2000 | Stuettler | 348/51 |
| 6,144,762 A | 11/2000 | Brooks | 382/154 |
| 6,525,878 B1 * | 2/2003 | Takahashi | 359/466 |
| 2003/0112509 A1 | 6/2003 | Takahashi | |

FOREIGN PATENT DOCUMENTS

| | | |
|---|---|---|
| DE | 42 02 505 A1 | 8/1993 |
| DE | 4405 102 A1 | 8/1994 |
| DE | 196 06 424 A1 | 9/1996 |
| EP | 0 845 693 A1 | 6/1998 |
| JP | 2001-117049 | 4/2001 |
| WO | WO 96/38986 | 12/1996 |

* cited by examiner

STEREO-EXAMINATION SYSTEMS AND STEREO-IMAGE GENERATION APPARATUS AS WELL AS A METHOD FOR OPERATING THE SAME

FIELD OF THE INVENTION

The invention relates to a stereo-examination system for imaging an object, a stereo-image generation apparatus for generating at least a pair of images of an object and a method for generating such images.

BACKGROUND OF THE INVENTION

The system and the method according to the invention serve to generate stereoscopic images and representations, respectively, of an object such that, when viewing the images, the observer obtains a three-dimensional impression of the object. To this end, it is required for the left eye and the right eye of the observer to perceive different images from different directions of view onto the object.

An example of a conventional stereo-examination system is a stereomicroscope. A beam path of a conventional stereomicroscope is schematically shown in FIG. 1. The stereomicroscope 1 shown there comprises an objective 3 with an optical axis 5 and an object plane 7 in which an object to be viewed is positioned. A beam bundle 11 emanating from the object or object plane 7 into a solid angle region 9 around the optical axis 5 images the objective 3 to infinity and thus converts it into a parallel image-side beam bundle 13. Two zoom systems, each having an optical axis 17 and 18, respectively, of its own, are positioned adjacent each other in the parallel beam bundle 13 such that the optical axes 17 and 18 of the zoom systems are offset parallel to the optical axis 5 of the objective 3 and spaced apart from each other by a distance a. The two zoom systems 15, 16 each feed a partial beam bundle 19 and 20, respectively, out of the parallel beam bundle 13, the partial beam bundle 19 being supplied to a left eye 21 of a user and the other partial beam bundle 20 being supplied to a right eye 22 of the user. To this end, a field lens 23, a prism system 25 and an ocular 27 are disposed in the beam path of each partial beam bundle 19, 20. As a result, the left eye 21 perceives the object 7 at a viewing angle α with respect to the optical axis 5, while the right eye 22 perceives the object at a viewing angle −α with respect to the optical axis. As a result, the user gets a stereoscopic, three-dimensional impression of the object.

FIG. 2 shows part of a beam path of a conventional microscope 1 for providing a stereoscopic image of an object for each one of two users. Similar to the microscope shown in FIG. 1, an objective 3 produces a parallel image-side beam bundle from a beam bundle 11 emanating from the object into a solid angle region, with two zoom systems 15 and 16 being provided, each feeding a partial beam bundle 19 and 20, respectively, out of the parallel beam bundle which are supplied via field lenses 23 as well as prism systems and oculars, not shown in FIG. 2, to the two eyes of a first observer.

In the parallel image-side beam path, there are further disposed two mirrors 31 which feed two further partial beam bundles 33 and 34 out of the parallel beam path and reflect the same such that they extend transversely to the beam direction of the partial beam bundles 19, 20. These two partial beam bundles 33 and 34 are each supplied, via a zoom system 35 and 36, respectively, as well as prism systems and oculars, not shown in FIG. 2, to the two eyes of a second observer.

In order for this microscope to be used by two observers, it is required that, while observing the object, the two observers are constantly in a fixed spatial position relative to the microscope. In particular, if the microscope is used as surgical microscope during a surgical operation, this spatial limitation is obstructive for the two observers who must operate as surgeons in the operating field.

Accordingly, it is an object of the present invention to provide a stereo-examination system and a stereo-image generation apparatus which provide degrees of freedom at least for one observer as regards his position relative to the object to be viewed.

SUMMARY OF THE INVENTION

According to a first aspect, the invention proceeds from a stereo-examination system for imaging an object, or an intermediate image produced from the object, comprising an objective arrangement with an optical axis and an object plane in which the object to be imaged, or the intermediate image, is positioned. The objective arrangement receives an object-side beam bundle emanating from the object, or intermediate image, into a solid angle region and converts the same into an image-side beam bundle. A selection arrangement selects or feeds at least a pair of partial beam bundles out of said image-side beam bundle which are supplied to an image transmission apparatus to generate a representation of the image information contained in each one of the partial beam bundles.

The stereo-examination system is distinguished in that it comprises a selection arrangement which is provided to displace a beam cross-section of at least one of the two partial beam bundles relative to a beam cross-section of the image-side beam bundle, i.e., to change the position of the beam cross-section of the fed-out partial beam bundle within the beam cross-section of the image-side beam bundle.

To this end, the stereo-examination system comprises a controller for controlling the selection arrangement such that it displaces the beam cross-section of the at least one partial beam bundle relative to the beam cross-section of the image-side beam bundle in circumferential direction about the optical axis. As a result, it is possible to eliminate and modify the fixed arrangement, as it is known from the prior art, of the fed-out partial beam bundle in circumferential direction about the optical axis of the object such that representations of the object can be supplied to the observer via the displaced partial beam bundles, said representations being generated from different, variable viewing angles. It is thus possible for the observer to move in azimuthal direction about the object and, when the selection arrangement is controlled accordingly, to view stereoscopic images of the object at different azimuth angles.

Preferably, the selection arrangement is provided to selectively choose only a first one or a second one of the pair of partial beam bundles from the image-side beam bundle. As a result, the individual partial beam bundles can be imaged, successively in time, by the image transmission apparatus. It is thus particularly easy to spatially separate the individual partial beam bundles from each other. This applies, in particular, if several pairs of partial beam bundles are fed out of the image-side beam cross-section for several observers.

Preferably, such a selection arrangement is provided as switchable stop which selectively transmits the first one or the second one of the partial beam bundles or still further partial beam bundles.

To this end, the switchable stop preferably comprises a plurality of separately controllable stop elements, each of which is switchable from a state in which they transmit much or substantially all light to a state in which they transmit less light or substantially no light. The stop elements are then controlled such that they are light-permeable in the region of the beam cross-section of the image-side beam bundle in which the respective partial beam bundle is to be shaped and light-impermeable in the remaining region of the image-side beam bundle. Subsequently, the stop elements are then switched into the light-permeable state in another region of the image side beam-cross section in order for the other partial beam bundle to be shaped there.

The switchable stop elements may be formed of liquid crystals or mechanically displaceable stop elements.

As an alternative to the provision of the selection arrangement as switchable stop, it can also be provided in the form of a switchable mirror disposed in the cross-section of the image-side beam bundle for selectively reflecting the first one or the second one of the partial beam bundles or further beam bundles. The beam bundles are then formed by reflection at reflection regions of the switchable mirror. To this end, the mirror preferably comprises separately controllable mirror members which are switchable from a state in which the light of the image-side beam bundle is reflected towards the image transmission apparatus to a corresponding non-reflecting or less reflecting state.

Preferably, the mirror members comprise liquid crystals or mechanically displaceable mirror elements.

The plurality of partial beam bundles successively fed out of the image-side beam bundle by the selection arrangement are preferably supplied to a common camera which is controlled by the controller such that it generates, successively in time, representations of the image information which is contained in the individual partial beam bundles.

Here, it is in particular possible to generate with one camera stereo-image pairs for several observers which are located at different positions in circumferential direction about the optical axis of the objective.

Alternatively, it is also provided for that, in order to generate each stereo-image pair, a pair of cameras is provided, each camera being allocated to a separate partial beam bundle. It is then possible to obtain simultaneously representations of the image information contained in the two partial beam bundles.

In this respect, it is provided for the two cameras to be jointly displaceable together with the two partial beam bundles. To this end, the cameras are connected to each other in rotationally fixed position with respect to a rotational axis, but can be jointly rotated about the same.

As an alternative thereto, it is provided for that the two cameras are stationary relative to the objective arrangement, and the selection arrangement comprises an optical system which is rotatable about a rotational axis in order to supply the two partial beam bundles which are displaceable about the optical axis to the two stationary cameras.

Preferably, the rotational optical system is an image-rotating optical system so that both cameras can directly generate the respective representations in correct image orientation.

Preferably, the rotational optical system comprises a Dove prism or a Schmidt-Perchan prism.

If the examination system is provided for use by several observers, it comprises preferably a beam-dividing arrangement to divide the image-side beam bundle and to supply it to several selection arrangements. In this case, a separate image transmission apparatus is allocated to each selection arrangement for respectively generating the stereoscopic representations for one observer.

If use is made of a beam-dividing arrangement, it offers a simple possibility to illuminate the object in that an illuminating light beam is fed into the beam path through the beam-dividing arrangement such that the illuminating light beam passes through the objective and is focused by the same onto the object.

Furthermore, it is provided for that the image transmission apparatus comprises at least three cameras, each of which receives a portion of the image-side beam bundle in fixed spatial relation relative to each other and generates a representation of the image information contained in the partial beam bundles supplied to the same. The selection arrangement then selects a pair of cameras from the at least three cameras to combine the representations thereof to a stereoscopic representation.

By selecting different camera pairs, partial beam bundles are thus selected for generating the representations which are differently positioned about the optical axis of the objective.

Preferably, the objective is provided such that it images the image-side beam bundle substantially to infinity and thus converts it to a substantially parallel beam bundle. However, the objective can also image to finity and form a convergent image-side beam bundle in which the selection arrangement is provided.

Preferably, the selection arrangement selects the partial beam bundles at a location of the image-side beam path where a Fourier plane is disposed.

Preferably, the image transmission comprises a display apparatus for representing the image information contained in the two partial beam bundles such that the image information of a first partial beam bundle of the pair of partial beam bundles is visible for the left eye of the observer and, correspondingly, the representation of the image information contained in the other, second partial beam bundle of the pair is visible for the right eye of the observer. The image transmission apparatus may comprise a viewing screen suitable for a stereoscopic image observation. For example, this may be a viewing screen which presents the two representations, successively in time, to the observer, the latter wearing shutter spectacles which are synchronized with said time sequence and alternately give the left eye and the right eye the view over the display screen. It is also possible for a separate image transmission apparatus to be allocated to each eye of the observer which is, in particular, worn directly on the head of the observer in front of the eye.

When neccessary for a correct stereo representation, the images are rotated by the image transmission apparatus about an image rotation angle such that the image rotation angle increases with increasing displacement of the partial beam bundles about the optical axis.

Preferably, the examination system then comprises a position detection apparatus to detect an azimuth position of the observer relative to the objective arrangement, the controller then using the detected azimuth position to adjust the displacement of the cross-sections of the two partial beam bundles relative to the beam cross-section of the image-side beam bundle in circumferential direction about the optical axis. The examination system can then supply stereoscopic representations to the observer from a perspective which corresponds to the perspective from which the observer would view the object directly, i.e., without the use of the objective arrangement.

BRIEF DESCRIPTION OF THE DRAWINGS

Embodiments of the invention will now be described in further detail with reference to the drawings, wherein.

DETAILED DESCRIPTION

Figure 3:
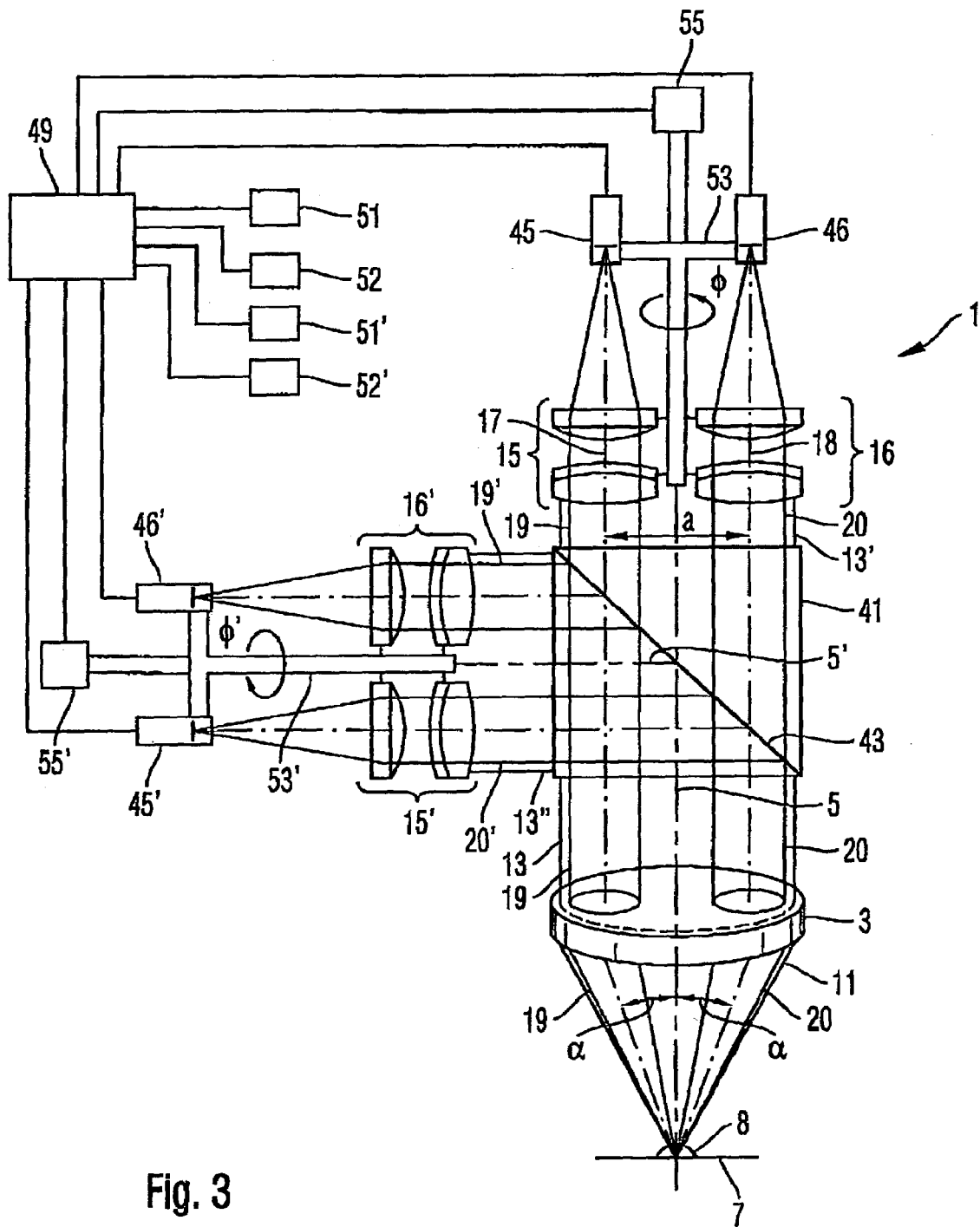
FIG. 3 shows an embodiment of a stereo-examination system according to the invention comprising several rotatable cameras.

An embodiment of a stereo-examination system according to the invention is schematically shown in FIG. 3. The stereo-examination system 1 comprises an objective 3 with an optical axis 5 and an object plane 7. An object 8 is positionable in the object plane 7. An object-side beam bundle 11 emanates from the object 8 or object plane 7 into a solid angle region 9 and is received by the objective 3 to be imaged to infinity and converted into a parallel image-side beam bundle 13, respectively, the optical axis 5 being disposed in a center of a beam cross-section of the image-side beam bundle 13.

Behind the objective 3, there is positioned a beam divider 41 in the beam path comprising a semi-transparent mirror surface 43 disposed at 45° to the optical axis 5. The beam divider 41 serves to divide the parallel image-side beam bundle into two portions 13' and 13", the beam portion 13' passing straightly through the beam divider 41 and the beam portion 13" emerging from the beam divider 41 at 90° to the optical axis 5.

After the beam divider 41, there are positioned two zoom systems 15 and 16 in the beam path of the image-side beam bundle 13', each of said zoom systems 15 and 16 having an optical axis 17 and 18, respectively, of its own. The optical axes 17 and 18 of the zoom systems 15 an 16 extend parallel to the optical axis 5. Furthermore, the zoom systems 15 and 16 are disposed symmetrically with respect to the optical axis 5 of the objective 3 and are spaced apart from each other by a distance a. Due to the geometric dimensions of the entrance lenses of the zoom systems 15, 16, only a portion of the radiation supplied by the image-side beam bundle 13' enters the zoom systems. These partial beam bundles 19 and 20 entering the zoom systems 15 and 16, respectively, are supplied by the zoom systems 15 and 16 to cameras 45 and 46 which are, for example, CCD cameras. Here, the camera 45 is fixedly allocated to the zoom system 15, and the camera 46 is fixedly allocated to the zoom system 16.

When extending the partial beam bundles 19, 20 entering the zoom systems 15 and 16 back to the object 8, it is evident that the camera 46 receives an image of the object 8 as it appears upon observation of the object 8 at a viewing angle α with respect to the optical axis 5 of the objective. Accordingly, the camera 45 receives an image of the object 8 as it appears upon observation of the object 8 at a viewing inclined at an angle a with respect to the optical axis 5. However, the viewing angles of the two images produced by the two cameras 45, 46 differ by a value of 2α. The images recorded by the cameras 45, 45 are digitally read out by a controller 49 and either stored or directly supplied to two displays 51 and 52, the display 51 representing the image received from the camera 45 and the display 52 representing the image received from the camera 46. The displays 51, 52 may be provided in the form of head-mounted display units worn on the head of a user, so that the display 51 is viewed by the left eye of the user and the display 52 is viewed by the right eye of the user. Accordingly, the left eye receives an image of the object 8 as it is generated upon observation of the object 8 inclined at an angle α to the optical axis 5, and the right eye of the user receives an image of the object as it is generated upon observation of the object 8 at a viewing angle α opposite thereto. As images of the same object but at different viewing angles are presented to the eyes of the user, the two images are a stereo-image pair, i.e., a pair of images which evokes a stereoscopic three-dimensional impression of the object 8 on the part of the user.

The two cameras 45, 46 and the two zoom systems 15, 16 are fixedly mounted in a common holder 53 which is rotatable about the optical axis 5 (see angle φ in FIG. 3). A motor 55 driven by the controller 49 is provided for driving the holder 53 together with the zoom systems 15 and 16 and the cameras 45, 46. By actuation of the motor 55, the zoom systems 15, 16 and the cameras 45, 46 are rotated about the optical axis 5 of the objective 3. As a result, the partial beam bundles 19, 20 supplied to the cameras 45, 46 are also displaced relative to the beam cross-section of the parallel image-side beam bundle 13'. As a result, the directions of view onto the object 8 of the images of the object 8 presented on the displays 51 and 52 change as well. Although the angle $2\alpha$ between the partial beam bundles imaged on the cameras 45, 46 is maintained, the partial beam bundles supplied to the cameras 45, 46 have been displaced in azimuthal direction (see angle $\phi$ in FIG. 3) about the optical axis 5, i.e., a stereobasis for the stereoscopic observation of the object has rotated about the optical axis 5 as compared to the situation shown in FIG. 3.

Preferably, the magnifying powers of the zoom systems 15, 16 are the same.

Accordingly, the stereo-examination system 1 can present stereoscopic image pairs to the user of the same as they are produced upon observation of the object 8, with a circumferential angle $\phi$ or azimuth of the stereobasis being freely adjustable by the controller 49. Methods for adjusting the azimuth by the controller 49 are described below.

The beam portion 13" of the image-side beam bundle extending along a mirrored optical axis 5' at 90° to the optical axis 5 of the objective 3 impinges on two zoom systems 15' and 16' disposed parallel to the mirrored optical axis 5', said zoom systems feeding two partial beam bundles 19' and 20' out of the beam bundle 13" and supplying the same to two cameras 45' and 46'. The images recorded by the cameras 45', 46' are likewise read out by the controller 49 and presented on displays 51' and 52', one display 51' being allocated to the camera 45' and the other display 52' being allocated to the camera 46.

The two displays 51' and 52' are provided for observation by a further user who is different from the user observing the displays 51 and 52.

The cameras 45' and 46', too, are mounted together with the zoom systems 15' and 16' on a holder 53' and rotatable about the mirrored optical axis 5'. To this end, a motor 55' controlled by the controller 49 is provided. Accordingly, the controller 49 can also adjust the azimuth for the stereobasis with which the further user observes the object 8. In particular, the azimuths of the stereobases of the two users are adjustable independently from each other.

Preferably, the magnifying power of the zoom systems 15' and 16' is adjustable independently from the magnifying power of the zoom systems 15 and 16.

Figure 1:
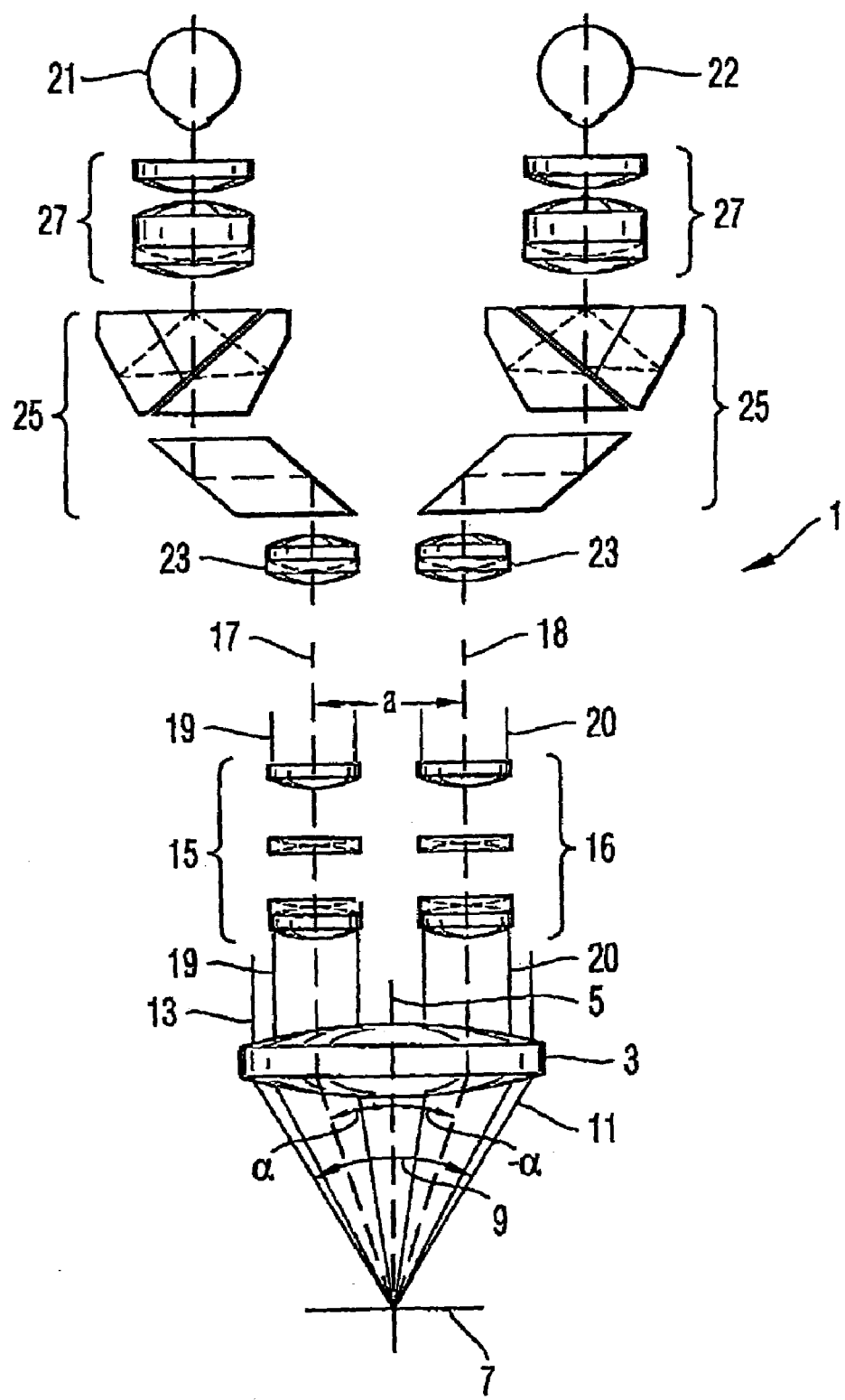
FIG. 1 shows a beam path of a conventional stereomicroscope.
Figure 2:
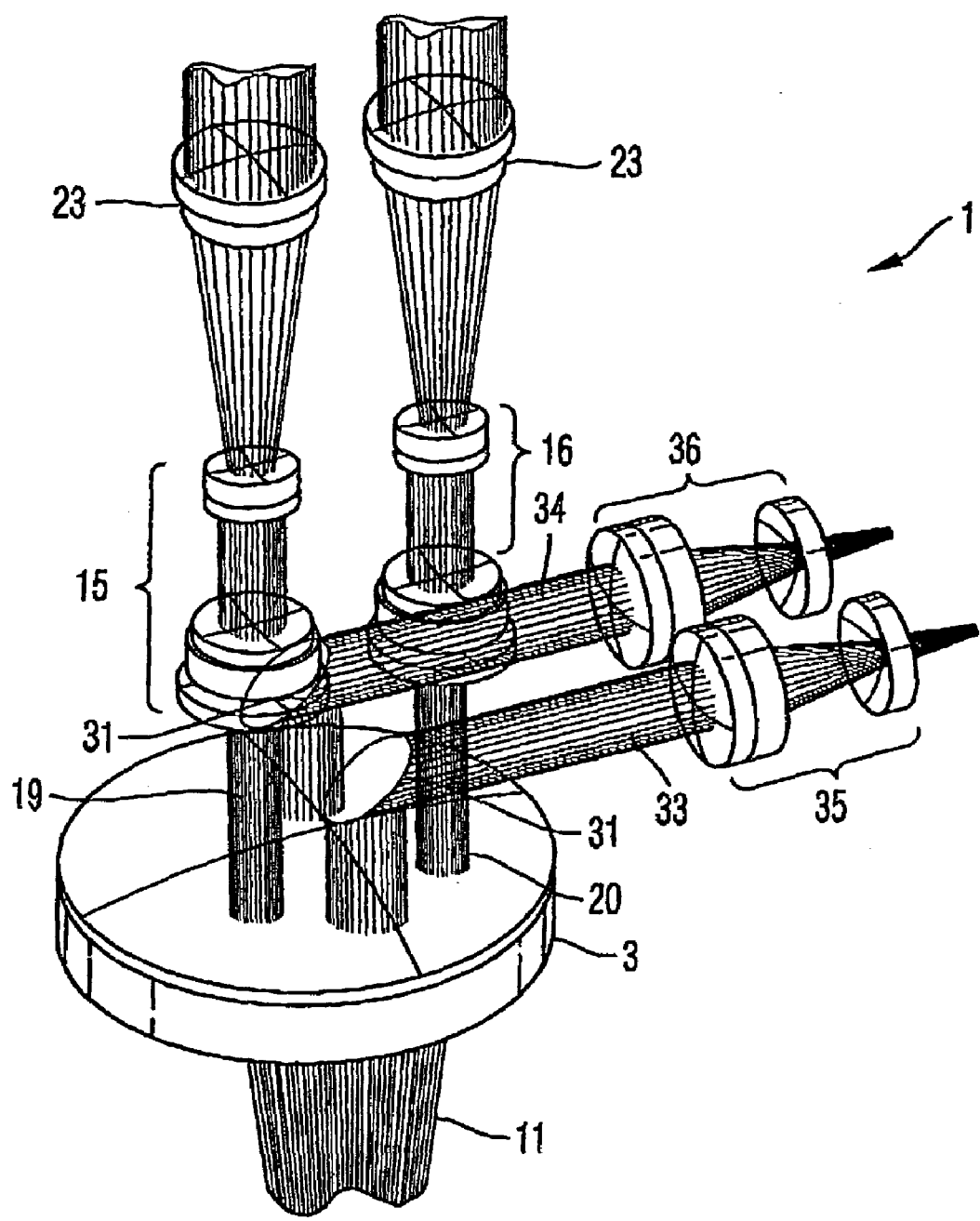
FIG. 2 shows a part of a beam path of a further conventional stereomicroscope for two observers.

In the following, variants of the stereo-examination system illustrated in FIG. 3 are described. Components which correspond to each other in structure and function are indicated by the same reference numbers as in FIGS. 1 to 3. For the purpose of distinction, they are, however, supplemented by an additional letter. For the purpose of illustration, reference is taken to the entire above description.

Figure 4:
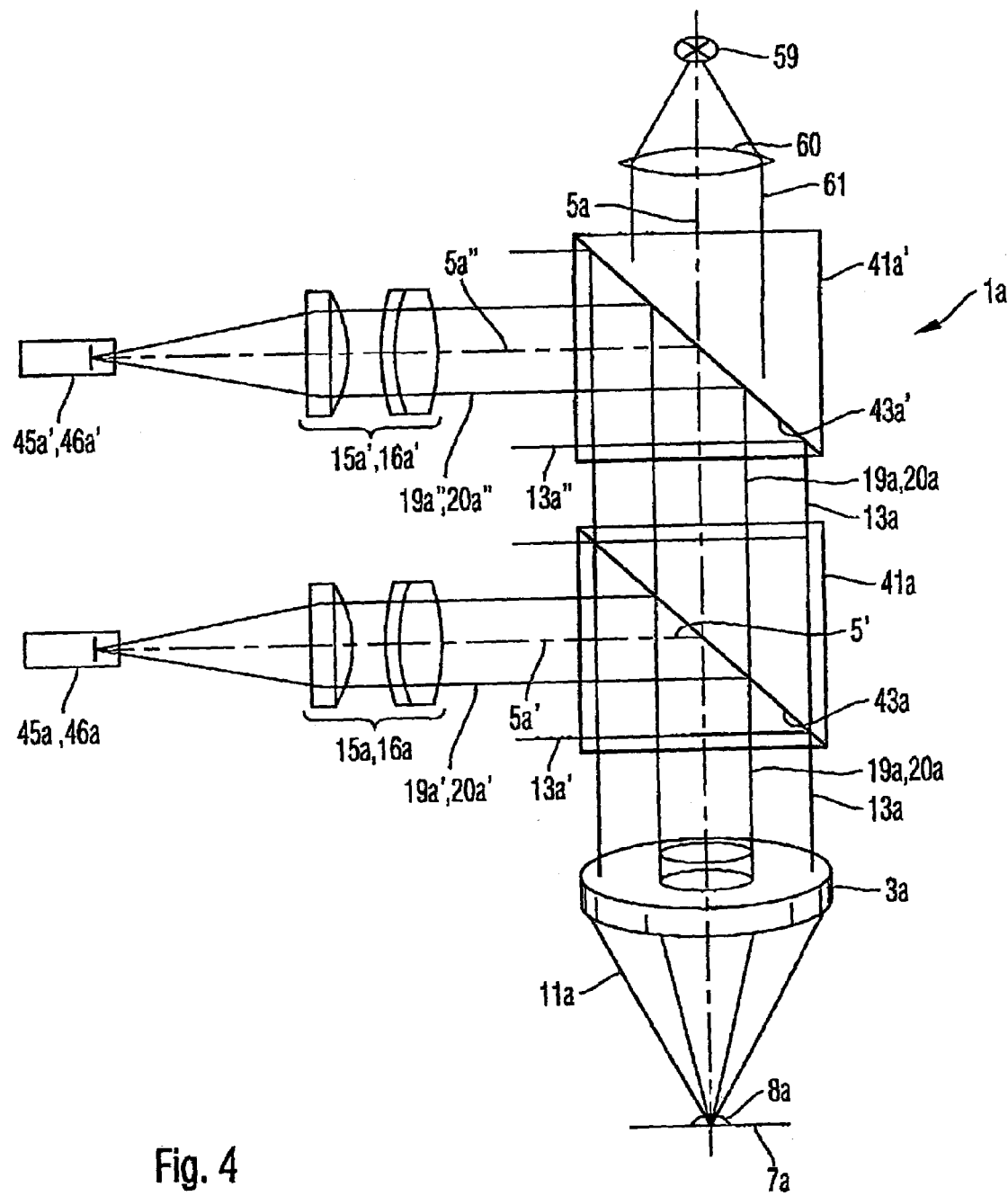
FIG. 4 is a schematically representation from the side of a further embodiment of a stereo-examination system according to the invention comprising several rotatable cameras.
Figure 5:
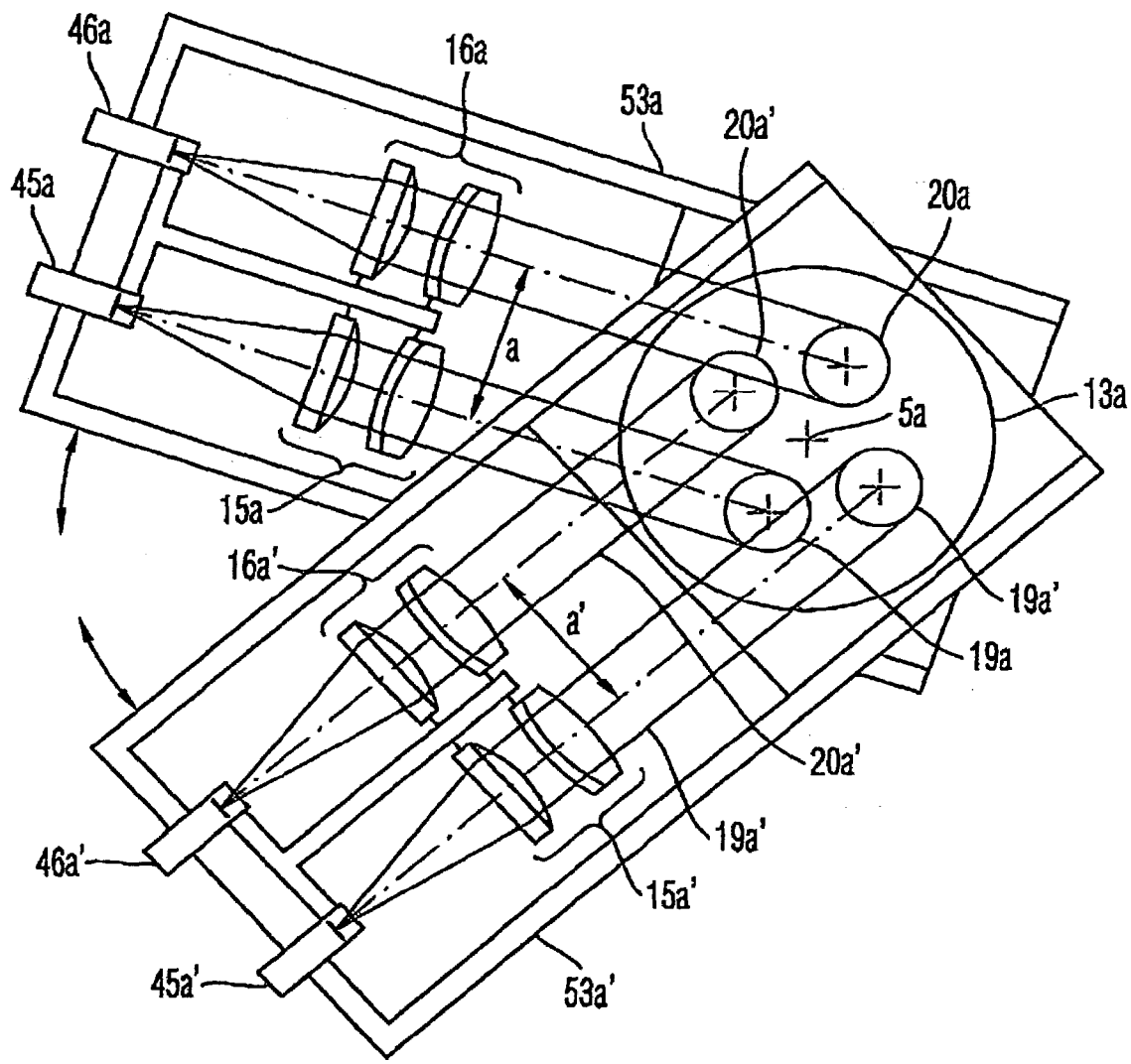
FIG. 5 is a plan view of the stereo-examination system shown in FIG. 4.

FIG. 4 is a side view and FIG. 5 a plan view of a further stereo-examination system 1a.

The stereo-examination system 1a again comprises an objective 3a with an optical axis 5a and an object plane 7a for positioning an object 8a. A beam bundle 11a emanating from the object 8a is converted by the objective 3a into a parallel image-side beam bundle 20a which enters a first beam divider 41a and is divided by a semi-reflective mirror 43a disposed at 45° to the optical axis 5a into a beam portion 13a' extending along a mirrored optical axis 5a' which extends at 90° to the optical axis 5a of the objective 3a and a beam portion 13a" passing straightly through the first beam divider 41a. The beam portion 13a" passing through the first beam divider enters a second beam divider 41a' and is reflected at 90° by a semi-reflective mirror 43a' disposed at 45° to the optical axis 5a so that it extends as mirrored beam portion 13a"' along a mirrored optical axis 5a"'.

The examination system 1a further comprises a lamp disposed on the optical axis 5a of the objective 3a, the light emitted from said lamp being shaped by means of a collimator 60 to form a parallel beam bundle 61 which successively passes through the second beam divider 41a' and the first beam divider 41a and subsequently the objective 3a in order to be shaped by the same to form a convergent beam for illuminating the object 8a.

The beam divider 41a (41a') is fixedly connected to a holder 53a (53a') which is supported to be rotatable about the optical axis 5a of the objective 3a, a motor, not shown in FIGS. 4 and 5, being provided to drive the same about the optical axis 5a. Moreover, the holder 53a (53a') supports a pair of zoom systems 15a, 16a (15a', 16a') and a pair of cameras 45a, 46a (45a', 46a'), each being symmetrically disposed with respect to the mirrored optical axes 5a' (5a"').

The zoom systems 15a, 16a (15a', 16a') transmit partial beam bundles 19a, 20a (19a', 20a') to the cameras 45a, 46a (45a', 46a') which, in the plan view of FIG. 5, are disposed adjacent one another and spaced apart from the mirrored optical axis 5a' (5a"').

The zoom systems 15a, 16a, 15a', 16a' thus feed partial beam bundles 19a, 20a, 19a', 20a' out of the parallel beam bundles 13a', 13a", the arrangement of said partial beam bundles in the beam cross-section of the parallel beam bundle 13a being particularly evident from the plan view of FIG. 5. The partial beam bundles 19a, 20a and 19a', 20a' form the stereobasis for the stereoscopic representations of the object produced by the cameras 45a, 46a and 45a', 46a', respectively, for observation by a first and a second user, respectively. By rotating the holders 53a and 53a' about the optical axis 5a, the stereobasis can be rotated about the optical axis 5a for each user such that each user can observe the object with different and individually adjustable azimuths of his stereobasis.

Figure 6:
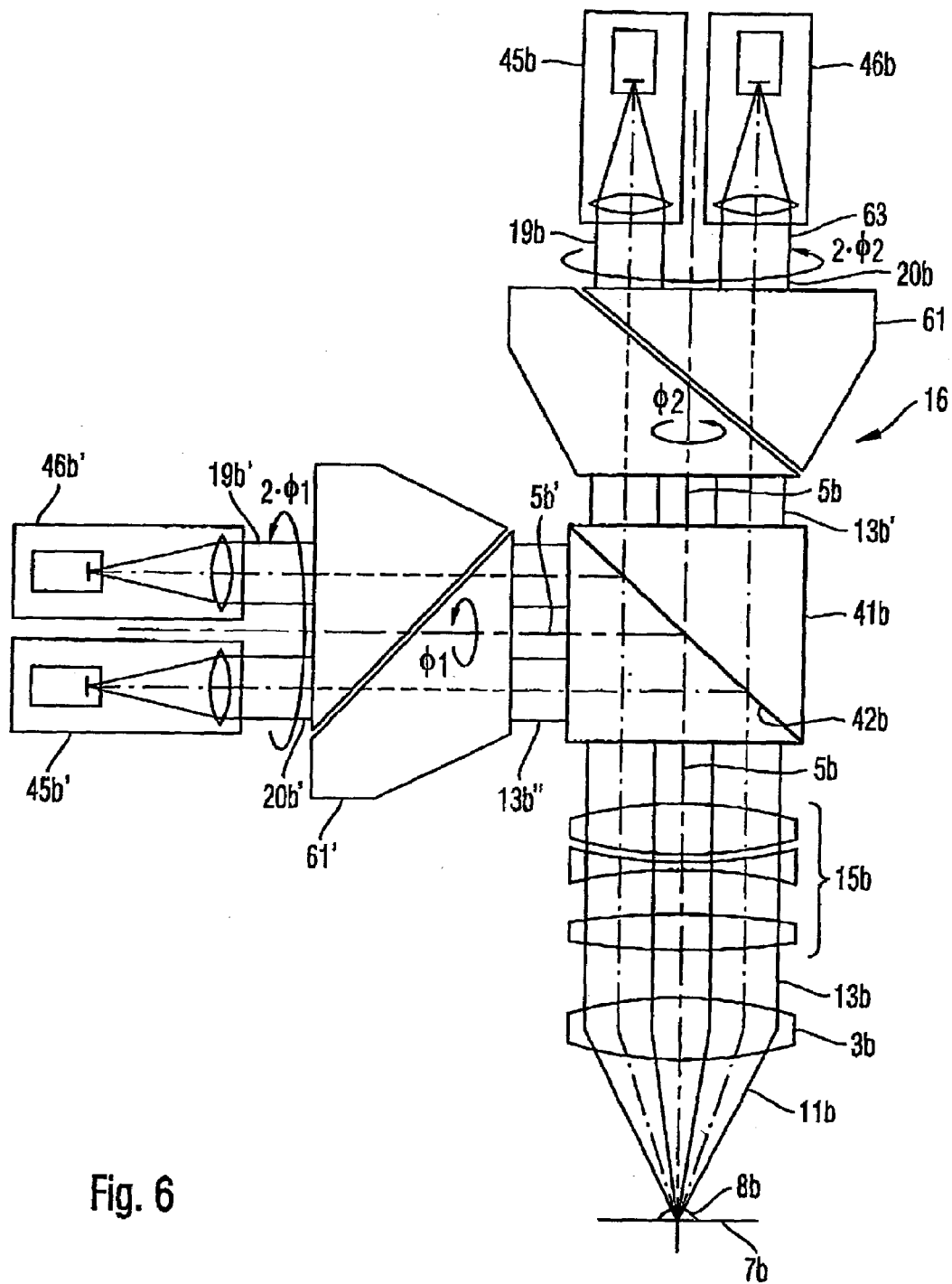
FIG. 6 shows an embodiment of a stereo-examination system according to the invention with stationary camera and rotatable optical system.

A stereo-examination system 1b shown in FIG. 6 comprises an objective 3b which converts a divergent beam bundle 11b emanating from the object 8b into a parallel image-side beam bundle 13b. A zoom system 15b is disposed in the parallel beam bundle 13b. After having passed through the zoom system 15b, the parallel beam bundle 13b enters a beam divider 41b which comprises a semi-transparent mirror 42b to divide the parallel beam bundle 13b into a parallel beam bundle 13b' propagating further along an optical axis 5b of the objective 3b and a parallel beam bundle 13b" extending at 90° to the optical axis 5b of the objective 3b.

The parallel beam bundle 13b' propagating further along the optical axis 5b of the objective 3b enters an image-rotating optical system provided as Schmidt-Perchan prism 61 and emerges from the same again as parallel beam bundle 63. Disposed in the beam path behind the image-rotating optical system 61, there is disposed a pair of cameras 45b, 46b adjacent each other in the parallel beam bundle 63, each camera feeding a partial beam bundle 19b and 20b, respectively, out of the beam bundle 63.

The two cameras 45b and 46b and the beam divider 41b are fixedly positioned with respect to the objective 3b. However, the image-rotating optical system 61 is disposed to be rotatable about the optical axis 5b. When the optical system 61 is rotated by an angle $\phi$ about the optical axis 5b, the beam bundle 63 emerging from the image-rotating optical system 61 is thus rotated relative to the parallel beam bundle 13b' entering the image-rotating optical system by an angle 2×φ about the optical axis 5b. As a result, an azimuth of the stereobasis of the stereoscopic representations produced by the cameras 45b, 46b can be rotated about the optical axis 5b by rotation of the image-rotating optical system 61 about the optical axis 5b, which rotation is caused by means of a motor, not shown in FIG. 6, via the controller, likewise not shown, of the examination system 1b.

A system comprising an image-rotating optical system 61' and cameras 45b' and 46b', corresponding to the system of image-rotating optical system 61 and cameras 45b, 46b, is disposed along the mirrored optical axis 5b' and serves to generate stereoscopic representations of the object 8b for a second user. For this user, too, an azimuth of the stereobasis can be changed for observation of the object 8b by actuation of a drive, not shown in the Figure, to rotate the image-rotating optical system 61' about the axis 5b'.

Figure 7:
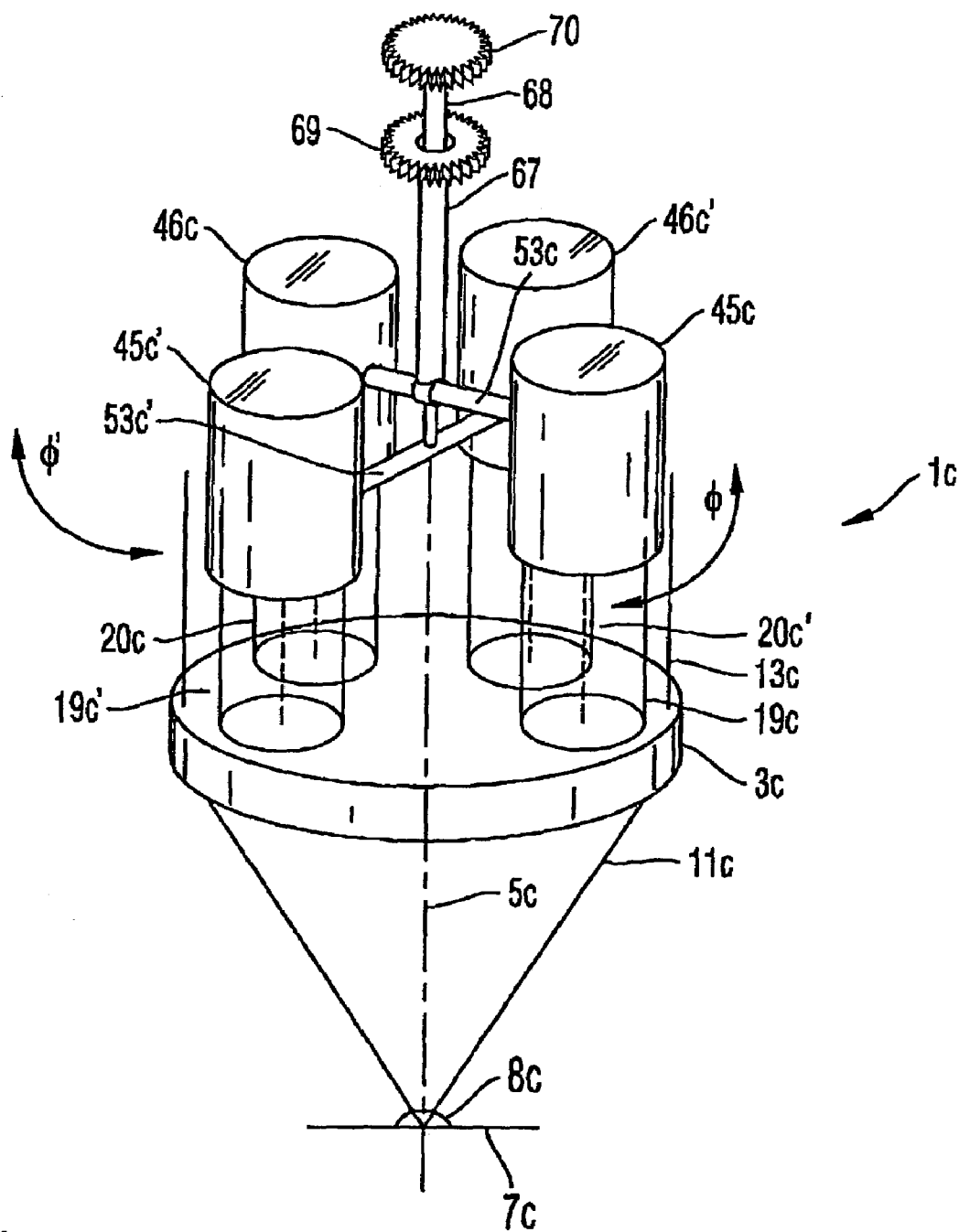
FIG. 7 shows a further embodiment of a stereo-examination system according to the invention with rotatable cameras.

A stereo-examination system 1c perspectively shown in FIG. 7 again comprises an objective 3c which converts a divergent beam bundle 11c emanating from an object 8c into a parallel beam bundle 13c. Four cameras 45c, 46c, 45c' and 46c' are disposed in the parallel beam bundle 13c, each one of the four cameras feeding another partial beam bundle 19c, 20c, 19c' and 20c' out of the parallel beam bundle. The representations of the object 8c generated by the cameras 45c and 46c are supplied to the eyes of a first user via a controller, not shown in FIG. 7, and the images generated by the pair of cameras 45c' and 46c' are presented to the eyes of a further user.

The cameras of the pair of cameras 45c, 46c are fixedly connected to each other by means of a rod 53c and cameras of the pair of cameras 45c', 46c' are likewise fixedly connected to each other by means of a further rod 53c'. The two cameras 45c, 46c are supported by a sleeve 67 connected to the rod 53c, while the cameras 45c' and 46c' are supported by a rod 68 traversing the sleeve 67 which is connected to the rod 53c. Both the sleeve 67 and the rod 68 are supported to be rotatable about an optical axis 5c of the objective 3c, with toothed wheels 69 and 70 being provided for the same to be driven on the sleeve 67 and rod 68, respectively. The toothed wheels 69 and 70 are in engagement with a drive, not shown in FIG. 7, to rotate the camera pairs 45c, 46c and 45c', 46c', respectively, in azimuth direction about the optical axis 5c. The camera pairs are independently rotatable about the optical axis 5c, the rotational angles, however, not being fully free, but rather limited by the cameras getting in abutment against each other.

Figure 8:
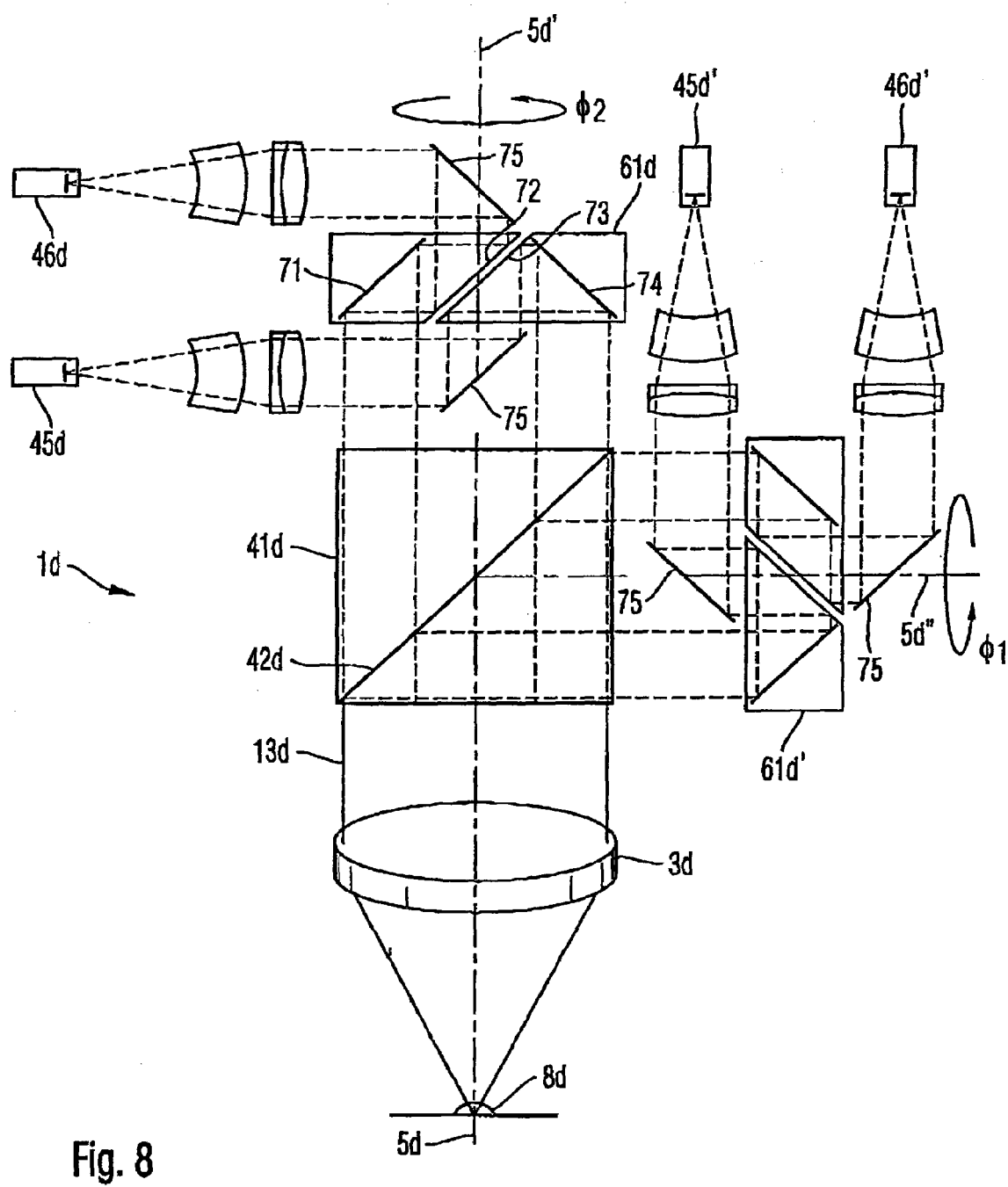
FIG. 8 shows a further embodiment of a stereo-examination system according to the invention with stationary cameras and rotatable optical systems.

A stereo-examination system 1d shown in FIG. 8 for generating stereoscopic image pairs for two observers is similar in construction to the examination system shown in FIG. 6. It likewise comprises two pairs of cameras 45d, 46d and 45d', 46d', respectively, which are fixedly positioned with respect to an objective 3d. Image-rotating optical systems 61d and 61d' are respectively disposed between a beam divider 41d and the camera pairs. In contrast to the embodiment shown in FIG. 6, the image-rotating optical system 61d, 61d' is not provided as Schmidt-Perchan prism, but comprises a plurality of mirror surfaces 71, 72, 73 and 74 which are disposed fixedly relative to each other and rotatably about the optical axes 5d' and 5d", respectively. Moreover, a stationary mirror 75 is allocated to each camera which feeds the partial beam bundle produced by the mirror system 61d into the respective camera. The image pairs generated by the camera pairs are again stereo-image pairs which present the object 8d stereoscopically to a respective observer. By actuating a drive, not shown in FIG. 8, of the mirror systems 61d, 61d', the azimuths of the stereobases for the respective observer are then rotatable about the optical axis 5d.

Figure 9:
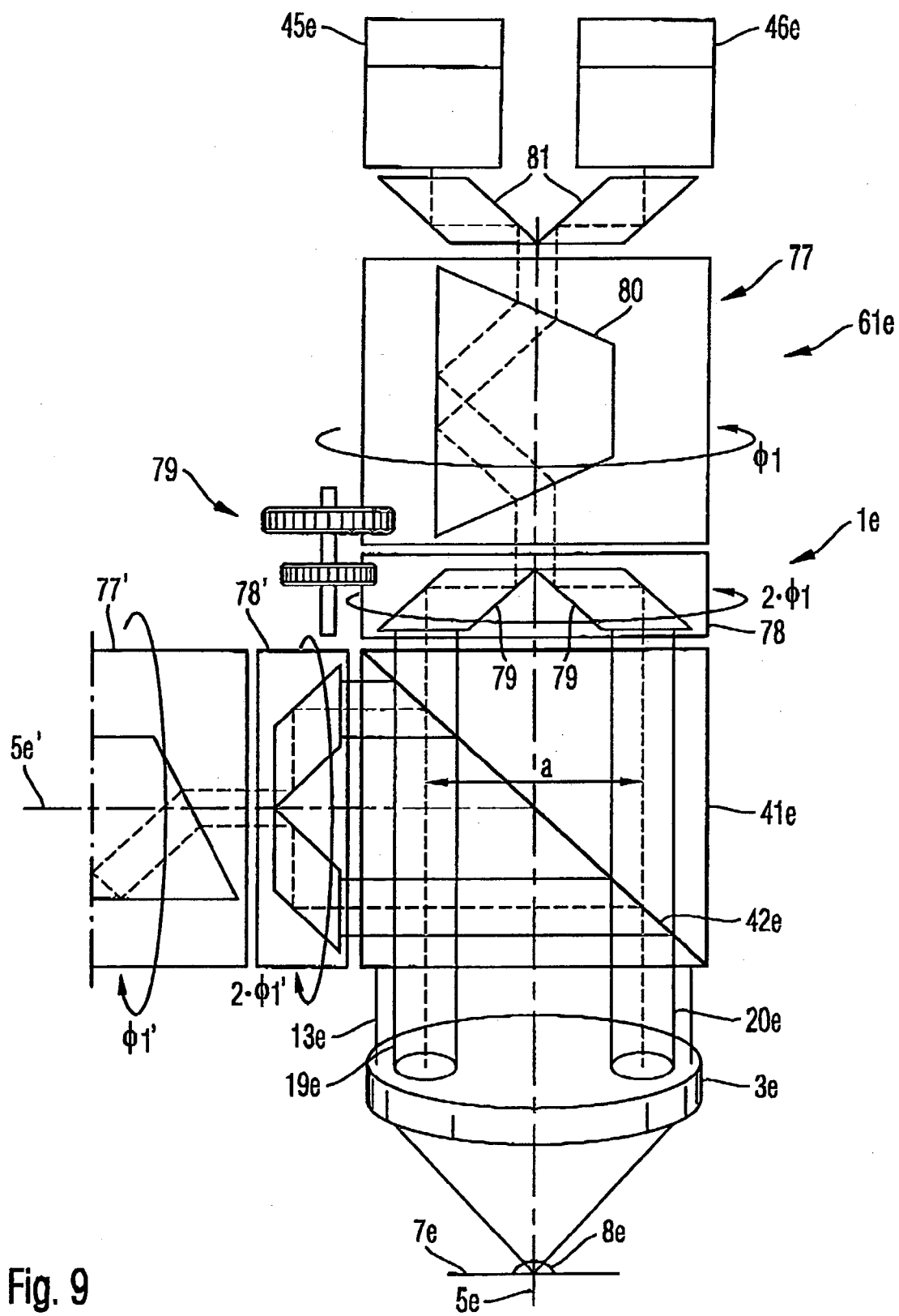
FIG. 9 shows a still further embodiment of a stereo-examination system according to the invention with stationary cameras and rotatable optical systems.

A stereo-examination system 1e schematically shown in FIG. 9 again serves to generate stereo-image pairs for two observers. The examination system 1e is substantially similar to the examination system shown in FIG. 6, but differs from the same as far as the structure of an image-rotating optical system 61e is concerned. The latter comprises two prism systems 77 and 78 which are rotatable relative to each other and about an optical axis 5e. The two prism systems 77 and 78 are driven by a gear system 79 to rotate about the optical axis 5e such that the prism system 78 rotates through an angle of 2×φ, while the prism system 77 rotates through an angle φ. The prism system 78 is disposed between a beam divider 41e and the prism system 77. It comprises two prisms 79 for moving two partial beam bundles 19e and 20e, which have been fed out of a parallel beam bundle 13e produced by an objective 3e and are spaced apart from each other by a relatively large distance a from the optical axis 5a, closer to the optical axis 5a. After having passed through the prism system 78, the partial beam bundles 19e, 20e enter the prism system 77 which comprises an image-rotating Dove prism 80. As the partial beam bundles 19e, 20e then extend relatively close to the optical axis, the Dove prism 80 can be of relatively small size. After having passed through the prism system 77, the partial beam bundles 19e, 20e are each supplied to a camera 45e and 46e, respectively, via double reflection prisms 81.

The images obtained by the cameras 45e and 46e are supplied to displays for a left eye and a right eye, respectively, of a first user.

A second user is supplied with images from the cameras 45e' and 46e' which generate images of the partial beam bundles 19e' and 20e' via an optical system which is disposed along the optical axis 5e' mirrored at the beam divider 41e. The components 77', 78', 79', 80' and 81' are similar to the corresponding components of the optical system disposed along the optical axis 5e.

Figure 10:
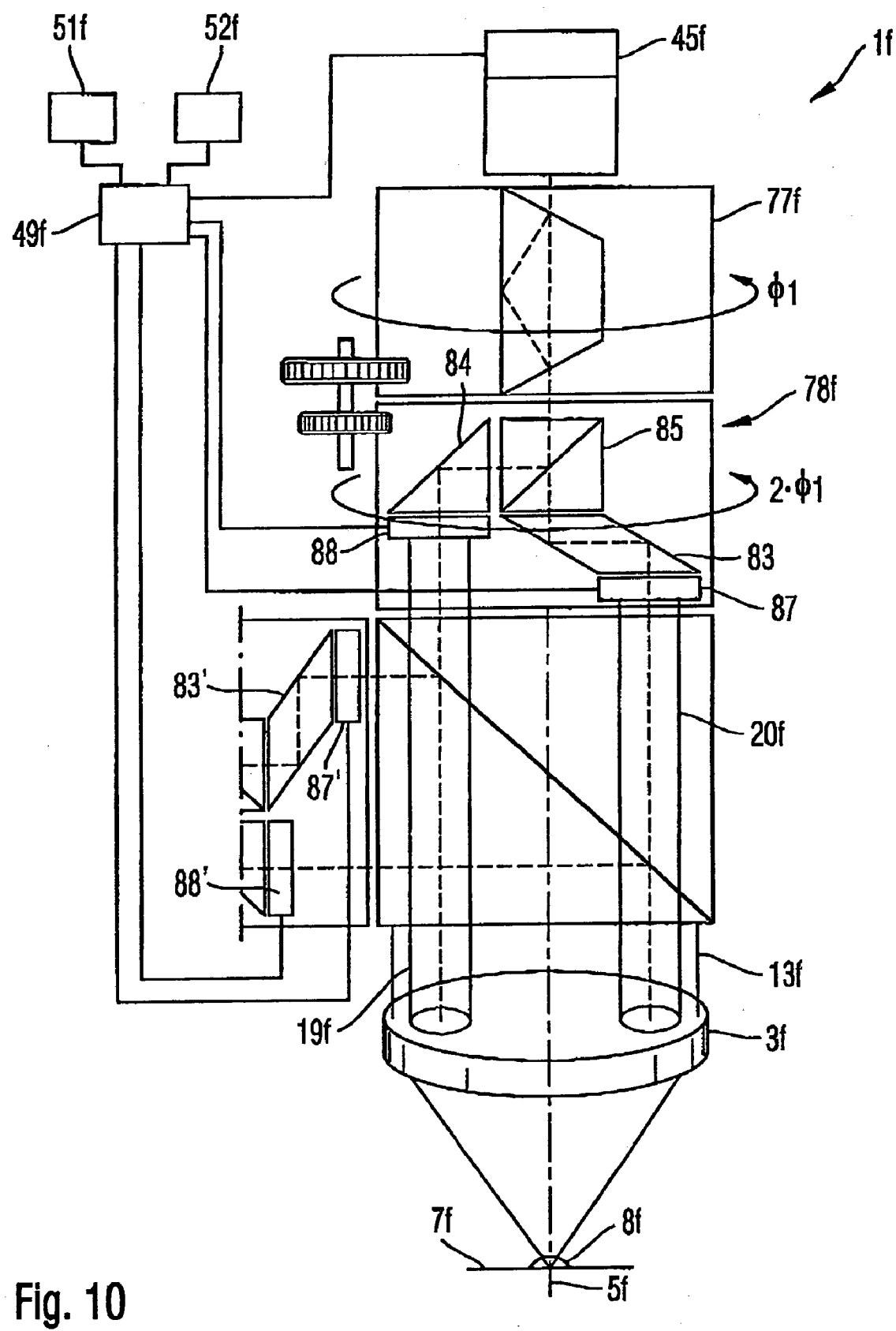
FIG. 10 shows a still further embodiment of a stereo-examination system according to the invention with stationary cameras and rotatable optical systems

A stereo-examination system 1f schematically shown in FIG. 10 again serves to generate stereo-image pairs for two observers. The examination system 1f is similar in construction to the examination system shown in FIG. 9. It likewise comprises two prism systems 77f and 78f which are adapted to be driven via a gear system 79f about an optical axis 5f such that the prism system 77f rotates about the optical axis at twice the rotational speed as the prism system 78f. Here, the prism system 78f also feeds two partial beam bundles 19f and 20 out of a parallel beam bundle 13f generated by an objective 3f. However, the prism system 78f serves to superpose the two partial beam bundles 19f and 20f along the optical axis 5f by means of deflecting prisms 83 and 84 and a beam coupler 83. In contrast to the embodiment shown in FIG. 9, the examination system if merely comprises a single camera 45f which is likewise disposed on the optical axis 5f to generate representations of the image information contained in the two partial beam bundles 19f, 20f. In order to separate the two representations from each other, the prism system 78f comprises a switchable shutter 87 disposed in the beam path of the partial beam bundle 20f as well as a further switchable shutter 88 disposed in the beam path of the partial beam bundle 19f. The shutters 87 and 88 are liquid crystal shutters which are switchable, by means of a controller 49f, from a state in which they transmit light to a state in which they transmit substantially no light. The controller 49f, first, switches the shutter 87 to the light-impermeable state and the shutter 88 to the light-permeable state so that the partial beam bundle 19f is directed to the camera 45f. The image of the object 8f thus produced by the camera 45f is read out by the controller 49f from the camera 45f and represented by the same on a display 51f for observation of the left eye of a first observer. Subsequently, the controller 49f switches the shutter 88 to the light-impermeable state and, correspondingly, the shutter 87 to the light-permeable state. As a result, the other partial beam bundle 20f is supplied to the camera, and the image thus recorded by the camera 45f is read out by the controller 49f and represented on a further display 52f for the right eye of the user. This procedure is then repeated so that the camera 45f alternately records the image information of the object 8f kcontained in the partial beam bundles 19f and 20f and represents the same on the displays 51f and 52f for the user's left eye and the right eye, respectively. Due to the partial beam bundles 19f and 20f being switched alternately in time, it is thus possible to obtain the image information contained therein by merely one camera.

There is a corresponding optical system provided for a second user, said optical system being disposed along an optical axis mirrored at the beam divider 41f and having the same structure as the optical system disposed along the optical axis extending through the beam divider 41f. For the sake of clarity, this optical system for the second user is not shown in full detail in FIG. 10.

Figure 11:
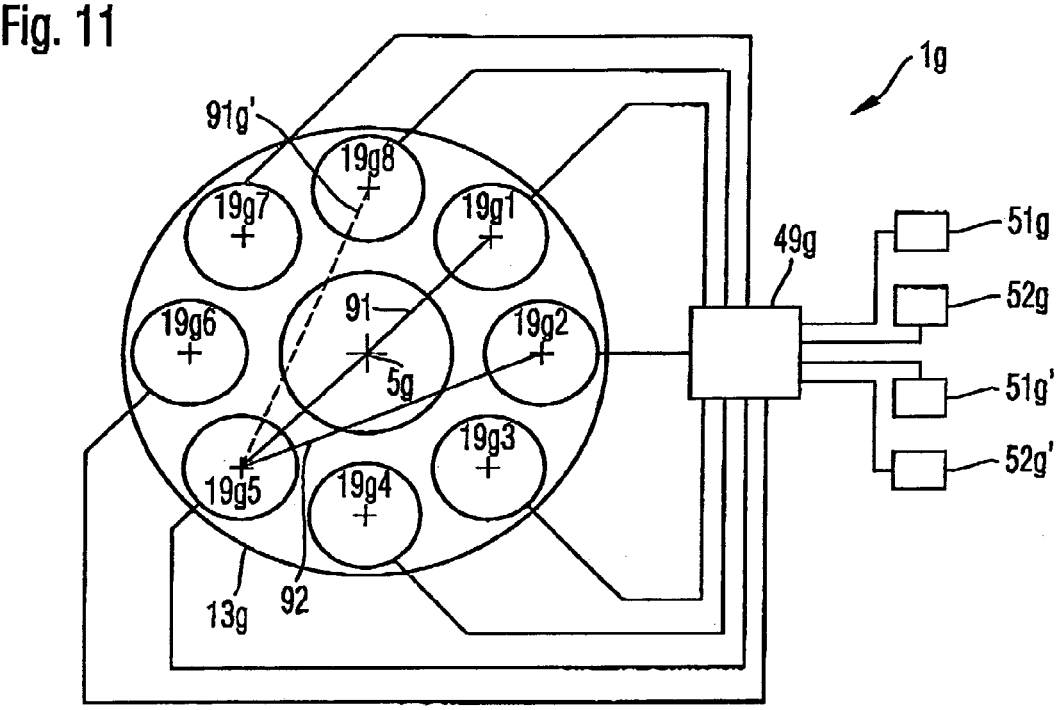
FIG. 11 is a schematic plan view of an embodiment of the stereo-examination system according to the invention comprising an image transmission apparatus with eight cameras.

FIG. 11 shows a plan view of a part of a stereo-examination system 1g. The examination system 1g shown in FIG. 11 is similar to the examination system shown in FIG. 7 in that it comprises more than three cameras, namely eight cameras, which are disposed at equal distance from an optical axis 5g, the eight cameras being fixedly disposed spaced apart from each other in circumferential direction about the optical axis 5g by the same distance. Each camera feeds a partial beam bundle 19g1, ..., 19g8 out of a parallel image-side beam bundle 13g to generate an image of the image information of an object contained in the respective beam bundles 19g1, ..., 19g8 and to supply the same to a controller 49g.

A pair of displays comprising two display apparatus 51g and 52g is connected to the controller 49g for providing a stereoscopic display for a first observer. Correspondingly, there are two display apparatus 51g' and 52g' connected to the controller 49g for a second observer. The controller 49g and the cameras cooperate as selection arrangement in that the controller 49g selects a first pair of cameras from the eight cameras to allocate these selected cameras to the displays 51g, 52g for the first user and to represent the images recorded by said pair of cameras on the corresponding displays, if applicable, after an image rotation. The controller 49g selects a second pair of cameras to allocate the same to the displays 51g' and 52g' for the second user and to represent the images recorded by said pair of cameras on the corresponding displays, if applicable, after an image rotation.

In the situation depicted in FIG. 11, the controller 49g has allocated the camera receiving the partial beam bundle 19g1 to the display 52g and thus to the right eye of the first user. The camera receiving the partial beam bundle 19g2 is allocated to the display 51g' and thus to the left eye of the second user. And the camera receiving the partial beam bundle 19g5 is allocated to the displays 51g and 52g' and thus to both the left eye of the first user and the right eye of the second user. Accordingly, the first user receives a stereoscopic representation of the object under observation with a stereobasis which is indicated in FIG. 11 by a line 91, while the second observer receives a stereoscopic representation of the object with a stereobasis which is indicated in FIG. 11 by a line 92. Both lines or stereobases 91 and 92 are disposed at different azimuth angles about the optical axis 5g. These azimuth angles of the stereobases 91, 92 are variable by the controller 49g. For example, the stereobasis for the first observer can be rotated about the optical axis 5g counter-clockwise in that the controller selects, instead of the camera receiving the partial beam bundle 19g1, the camera receiving the partial beam bundle 19g8 for allocation to the display 52g observed by the right eye of the first user so that a stereobasis 91g' results for this user which is shown in FIG. 11 as dotted line.

Figure 12:
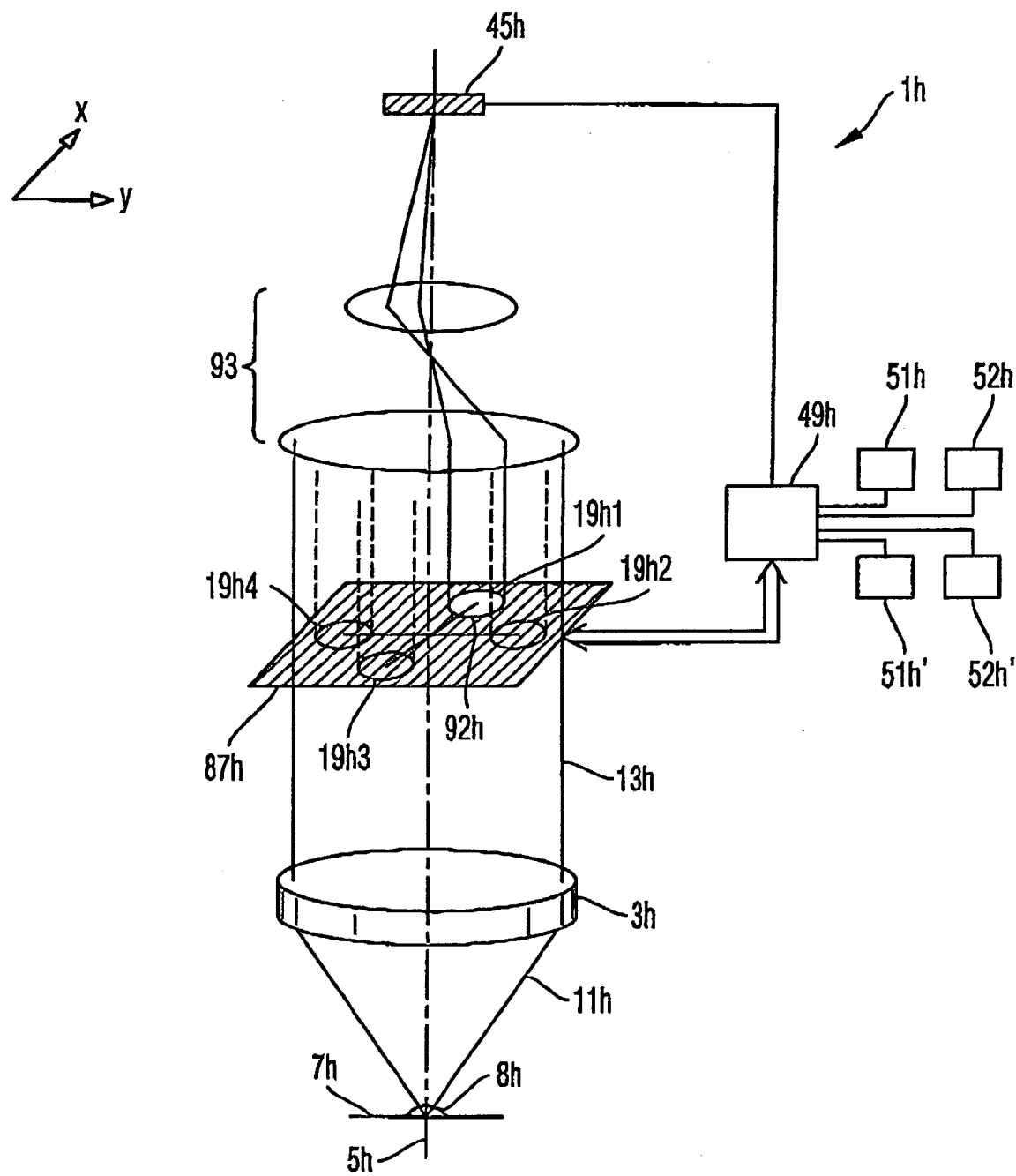
FIG. 12 shows an embodiment of a stereo-examination system according to the invention comprising a switchable stop.

FIG. 12 schematically shows a further stereo-examination system 1h. It serves again to present stereoscopic pairs of images of an object 8h on displays 51h and 52h to a left eye and a right eye, respectively, of a first user and on displays 51h' and 52h' to a left eye and a right eye, respectively, of a second observer. To this end, the examination system 1h further comprises an objective 3h for generating a parallel image-side beam bundle 13h from a divergent beam bundle 11h emanating from the object 8h and an imaging optical system 93 for transmitting the parallel beam bundle 13h to a CCD camera chip 45h so that a sharp image of the object 8h is formed on the same.

In the beam path of the parallel beam bundle 13h, there is provided a switchable stop 87h in a plane which corresponds to a Fourier plane of the objective 3h with respect to the object plane 7h thereof. The stop 87h is a liquid crystal stop having a plurality of liquid crystal elements (pixels) which are switchable by the controller 49h from a state in which they transmit light to a state in which they transmit less light. In the plane of the stop 87h, the controller 49h comprises selected regions 19h1, 19h2, 19h3 and 19h4 which correspond to partial beam bundles whose image information is represented on the displays 51h to 52h' for the observers. Here, the region 19h1 is allocated to the display 52h and thus to the right eye of the first user, the region 19h3 is allocated to the display 51h and thus to the left eye of the first user, the region 19h2 is allocated to the display 51h' and thus to the left eye of the second user, while the region 19h4 is allocated to the display 52h' and thus to the right eye of the second user.

The camera 45h records, sequentially in time, the image information contained in the individual partial beam bundles for representation on the displays 51h to 52h'. To this end, the stop elements or pixels of the LCD stop 87h which are disposed outside of said regions 19h1 to 19h4 are constantly switched to the state in which they transmit less light. Of the pixels disposed in the regions 19h1 to 19h4, merely the pixels disposed in the region 19h1 are switched, in the situation shown in FIG. 12, to the state in which they transmit much light, while the pixels of the other regions 19h2, 19h3 and 19h4 are switched to the state in which they transmit little light. Accordingly, the camera records in this switching sate the image information contained in the partial beam passing through he cross-section of the region 19h1. The controller 49h reads this image information out of the camera 45h and presents the same on the display 52h for the right eye of the first user.

Subsequently, the pixels contained in the region 19h1 are switched to the state in which they transmit less light, while the pixels contained in the region 19h3 are switched to the state in which they transmit much light. Accordingly, the cross-section of the region 19h3 is exposed for transmission of the corresponding partial beam bundle, and the camera 45h records the image information contained in this partial beam bundle which is read out by the controller 49h and presented on the display 51h for the left eye of the first observer.

Subsequently, the pixels of the LCD stop 87h contained in the region 19h3 are switched to the state in which they transmit less light. A corresponding procedure is then carried out for the regions 19h2 and 19h4, i.e., first, a picture of the partial beam traversing the cross-section of the region 19h2 is taken by the camera 45h and represented on the display 51h' and, then, a corresponding picture is taken of the partial beam bundle traversing the region 19h4 and presented on the display 452h' for the right eye of the second observer.

Accordingly, the first observer obtains as stereoscopic representation of the object 8h with a stereobasis which is indicated in FIG. 12 by a line 91h, while the second observer obtains a stereoscopic representation with a stereobasis which is indicated by a line 92h.

Herein the images recorded by the camera are rotated in their image planes by the controller before transmission to the displays 51h, 52h and 51h', 52h', respectively, such that they are displayed to the observer in their correct orientation. This is, inparticular, the case, if a direction of the stereobasis 19h1 and 19h2 is a horizontal direction in the displayed images.

By use of the switchable stop 87h as selector for selecting the individual partial beam bundles to be imaged, particular degrees of freedom are obtained for the adjustment of the stereobases 91h, 92h for the individual users. It is not only possible to displace the stereobases azimuthally about an optical axis 5h in that the controller 49h selects regions which are displaced with respect to the regions 19h1 to 19h4 in circumferential direction about the axis 5h to switch the same, successively in time, into their light-permeable state, which results into the stereobases 91h, 92h being rotated about the optical axis 5h. Rather, it is also possible to change the lengths of the stereobases in that the distance between the regions 19h1 and 19h3 and 19h2 and 19h4, respectively, is reduced. Moreover, it is also possible to displace the stereoscopic bases 91h and 92h in parallel. This results in that the respective observer perceives the object 8h at the same azimuth but at a different elevation.

The individually controllable liquid crystal switching elements of the stop 87h can be disposed periodically in a field in two directions (X,Y) extending orthogonally to each other.

Figure 13:
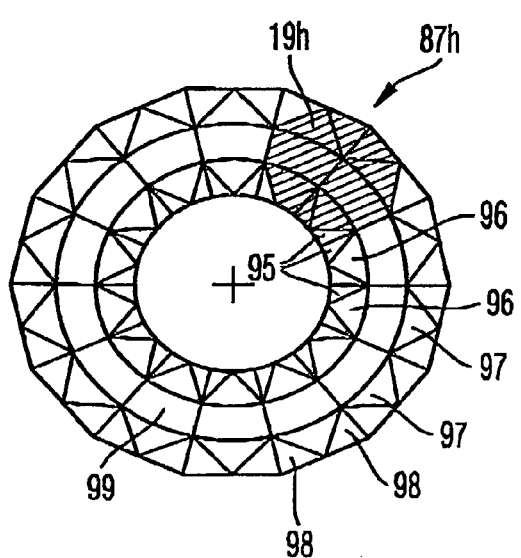
FIGS. 13 to 16 show variants of the switchable stop shown in FIG. 13.

A variant thereof is schematically shown in FIG. 13. A swichtable stop 87h comprises a plurality of liquid crystal elements which are individually switchable. These elements comprise triangular elements 95, 96, 97 and 98 as well as arcuate segments 99 defining a segmented circle. The segments 95, 96, 97, 98 and 99 are combined such that, together, they form a circular switchable stop. In order to open the stop allowing a partial beam bundle 19h to pass therethrough, a plurality of the elements are switched by the controller into the sate in which they transmit much light, as it is shown in FIG. 13 by the hatched elements, while all other elements are switched to the state in which they transmit little light.

Figure 14:
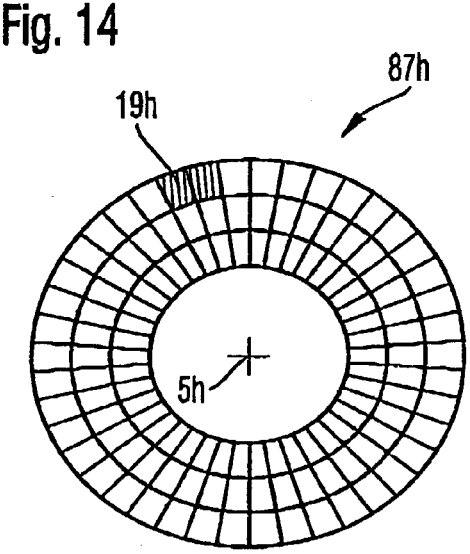

A further variant of a switchable stop 87h is shown in FIG. 14. This switchable stop 87h, too, is of circular shape, the switchable elements being each of square shape and are distributed in circumferential direction about the optical axis 5h in three annular rings. FIG. 14 shows two switchable elements in hatched outline which is to indicate that they are switched to the state in which they transmit much light in order to allow a partial beam bundle 19h to pass therethrough, while all other switchable elements are switched to the state in which they transmit little light.

Figure 15:
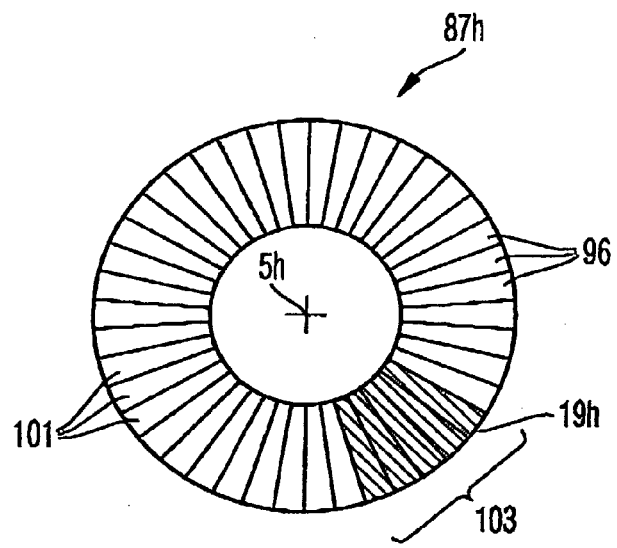
Figure 16:
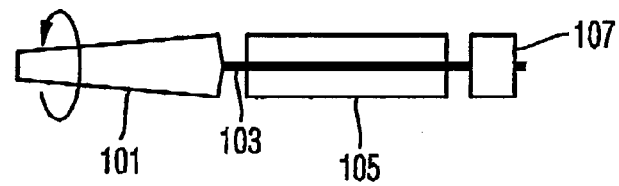

A further variant of a switchable stop 87h is illustrated in FIGS. 15 and 16. The stop 87h shown in plan view in FIG. 15 comprises a plurality of switching elements 96 which are mechanically switchable between a state in which they are permeable to light and a state in which they are impermeable to light. Each switching element 96 comprises a sector-shaped lamella 101 which is supported in a bearing 105 to be rotatable about a rotational axis 103 and is driven by means of an actuating drive 107 controlled by the controller 49h to rotate about the axis 103. The plurality of lamellas 101 is disposed in circumferential direction about the optical axis 5h, the rotational axis 103 of each lamella 101 being oriented radially with respect to the optical axis 5h, as it is shown in FIG. 15. The drives 107 of the lamellas 101 can change the orientation thereof about the axis 103 from a first position in which the lamellas 101 lie flat in the paper plane of FIG. 15 to a second position in which the lamellas 101 are oriented perpendicular to the paper plane of FIG. 15. In the fist position, the lamellas substantially prevent light from passing through, and in the second position, they substantially allow light to pass through. In FIG. 15, a region 104 is shown in hatched outline in circumferential direction in which the lamellas 101 are in their second light-transmitting position, while all other lamellas 101 are in the first position in which they prevent light from passing through. Accordingly, the partial light bundle 19h can freely pass through the region 104. The controller can thus define different regions in circumferential direction for the passage of a partial beam bundle and switch the same, successively in time, to the light-permeable state so that the camera 45h can record the image information contained in this partial beam bundle.

Figure 17:
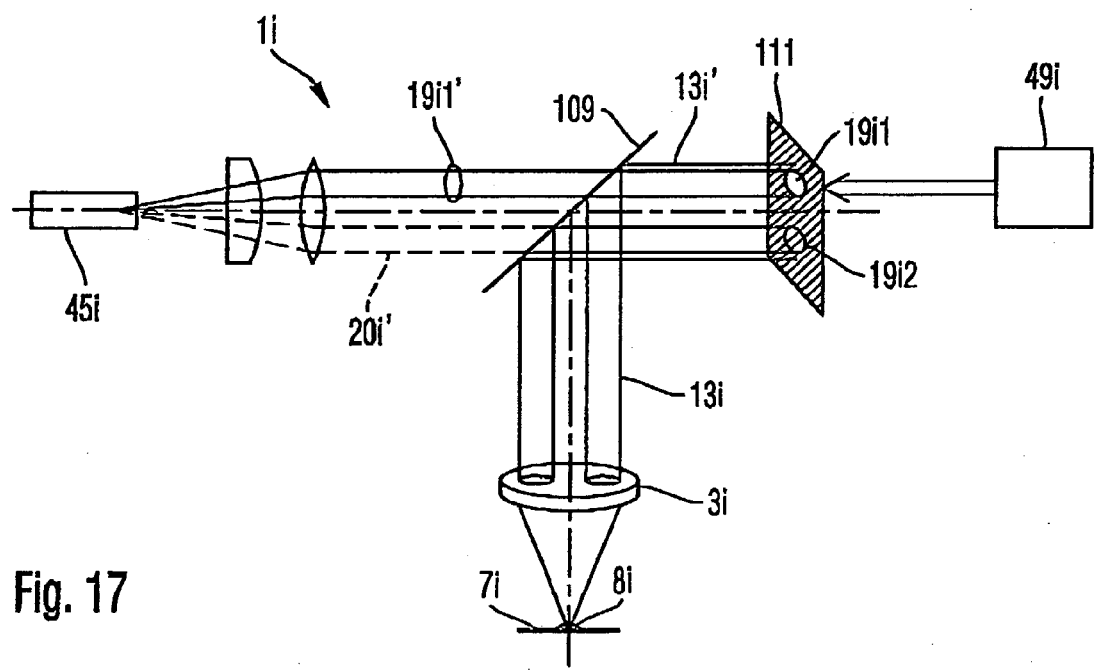
FIG. 17 shows an embodiment of a stereo-examination system according to the invention comprising a switchable mirror arrangement.

In order to select the partial beam bundles imaged on the camera, the stereo-examination system shown in FIG. 12 comprises a switchable transmission device, namely the switchable liquid crystal stop. However, it is also possible to provide a similar system with a switchable reflection device, as it is illustrated in FIG. 17. In the stereo-examination system ii schematically shown in this Figure, a parallel image-side beam bundle 13i is deflected through 90° C. at a polarizing beam divider 109 and impinges as polarized parallel beam bundle 3i' on a switchable mirror 111. The switchable mirror 111 comprises a plurality of individual switchable mirror elements which are formed as liquid crystal elements. In a first switching state, the liquid crystal elements reflect the impinging radiation of the beam bundle 3i' with a polarization such that the reflected radiation passes through the polarizing beam divider 109, while it reflects the radiation with another polarization in a second switching state so that the reflected radiation does not pass through the polarizing beam divider 109.

In the state shown in FIG. 17, a controller 49i has determined two regions 19i1 and 19i2 of the mirror 111 which are alternately switched from the first switching state to the second switching state. All other regions of the mirror 111 remain permanently in the second switching state. In FIG. 17, a situation is shown in which the region 19i1 is switched to the state in which the radiation reflected in this region passes through the polarizing beam divider 109 as partial beam bundle 19i1' and exposes a camera 45i.

A method for adjusting a stereobasis of the stereo-examination system will now be described in further detail with reference to FIGS. 18 and 19.

Figure 18:
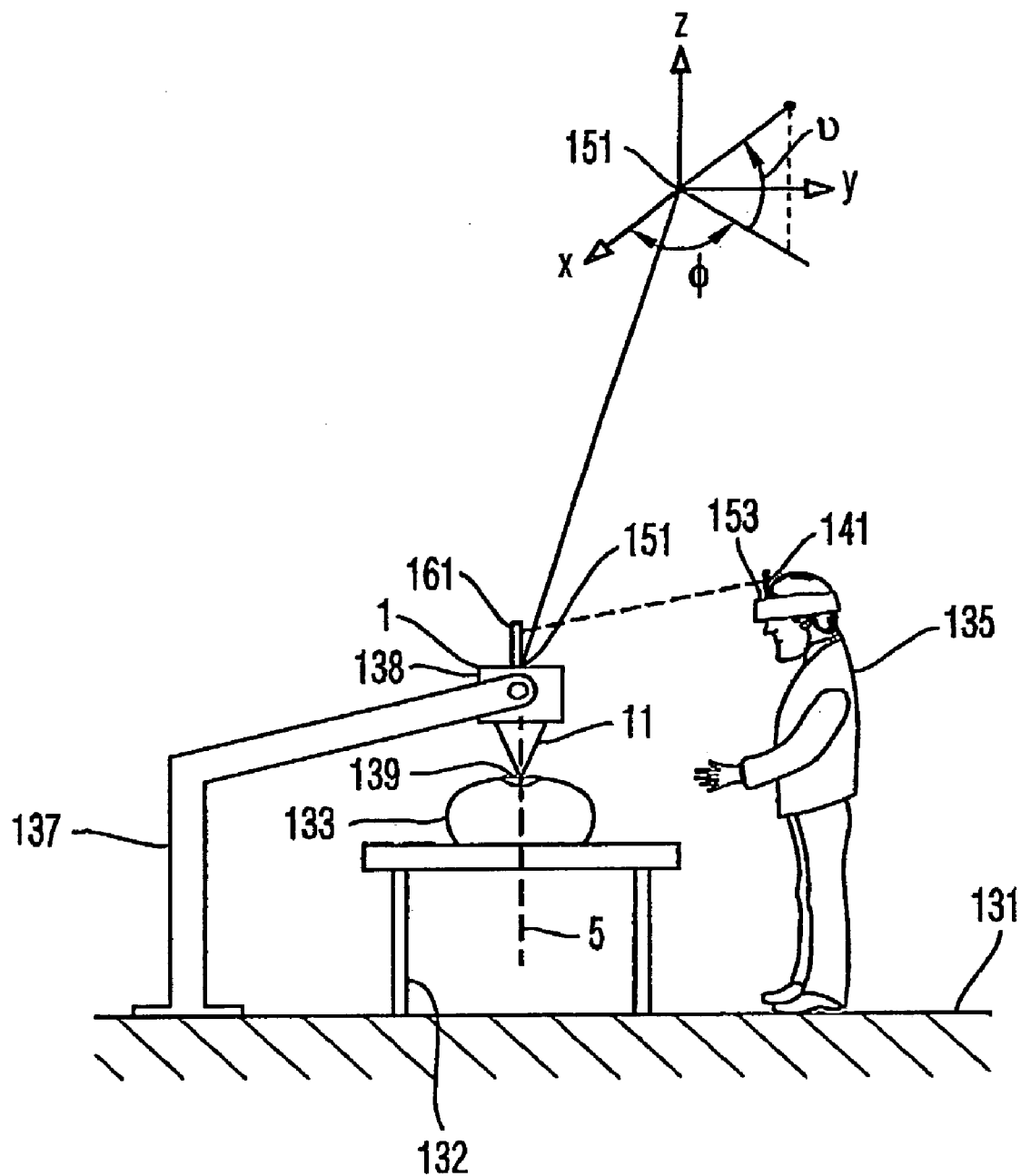
FIG. 18 is a schematic representation of the stereo-examination system according to the invention together with a user.

FIG. 18 shows an operating room. An operating table 132, on which a patient 133 lies on whom a microsurgery is being performed by a surgeon 135 is fixedly mounted on the floor 131 of the operating room. A microscope 138 is mounted to a stand 137 fixedly attached to the floor 131 of the operating room such that it records images of an operating field 139 and visibly represents the same for the surgeon 135. To this end, the surgeon 135 wears a head-mounted display apparatus 141 comprising two displays 51, 52 which together present stereoscopic images to the left eye and the right eye of the surgeon. The images to be represented are transmitted wireless as data from the microscope 138 mounted on the stand to the display apparatus 141. A preset fixed point 151 of the microscope 138 is defined as point of origin of a polar coordinate system. Moreover, at the display apparatus 141 of the surgeon, there is defined a reference point 153, the position of which relative to the fixed point 151 is determined as an azimuth φ and an elevation υ by a position detection apparatus 161 of the examination system which is attached to the microscope 138 near the fixed point 151 and shown in detail in FIG. 20.

Figure 19:
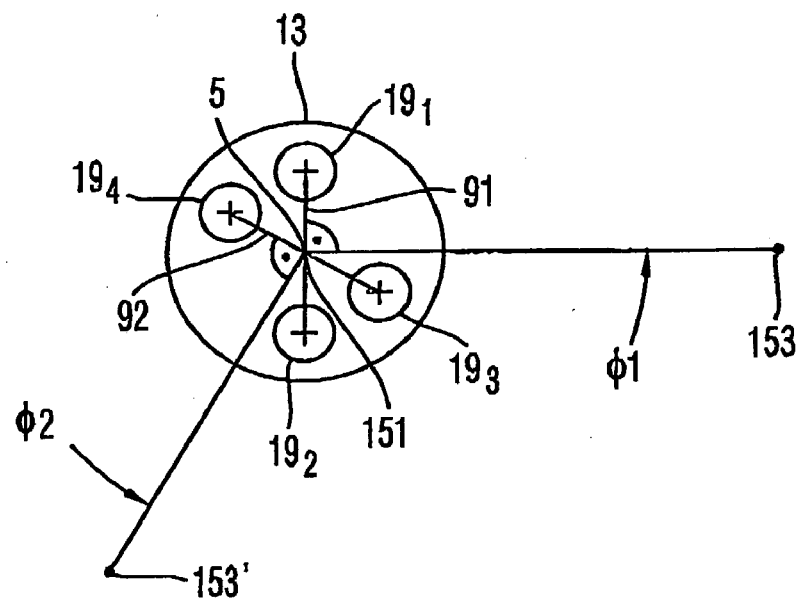
FIG. 19 is a plan view of stereobasis of the examination system shown in FIG. 18.

An arrangement of a stereobasis 91 for the stereo-images provided for the surgeon 135 is shown in plan view onto the XY-plane of the operating room in FIG. 19. The fixed point 151 at the microscope 138 is selected such that, in plan view onto the XY-plane, it coincides with the optical axis 5 of the microscope 138. The stereobasis for the surgeon 135 shown as line 91 is oriented azimuthally such that a connecting line between the reference point 153 of the surgeon 135 and the fixed point 151 extends orthogonally to the line 91. If the surgeon 135 moves in the operating room and, in so doing, changes his position φ1 relative to the fixed point 151 in circumferential direction about the optical axis 5, the controller 49 readjusts the stereobasis correspondingly such that the stereobasis continues to be disposed orthogonally to the connecting line between the surgeon 135 and the optical axis 5. The surgeon 135 thus gets a stereoscopic image impression of the operating field 139 via the display apparatus 141 which corresponds substantially to an image impression which the surgeon 135 would obtain if he viewed through a stereomicroscope shown in FIGS. 1 and 2 onto the operating field 139. However, the surgeon 135 is now no longer obstructed in his freedom of movement around the operating field 139 by the position of oculars of the stereomicroscope.

In particular, the examination system 1 can likewise obtain a stereoscopic representation of the operating field 139 for a second surgeon, whose azimuthal position is indicated by 153' in FIG. 19, via a display apparatus worn by the same, with a stereobasis 92 for the stereoscopic representation supplied to the second surgeon being adapted to the azimuthal position φ$_2$ of the same in that the stereobasis 92 also extends orthogonally to a connecting line between the position 153' of the second surgeon and the optical axis 5.

Figure 20:
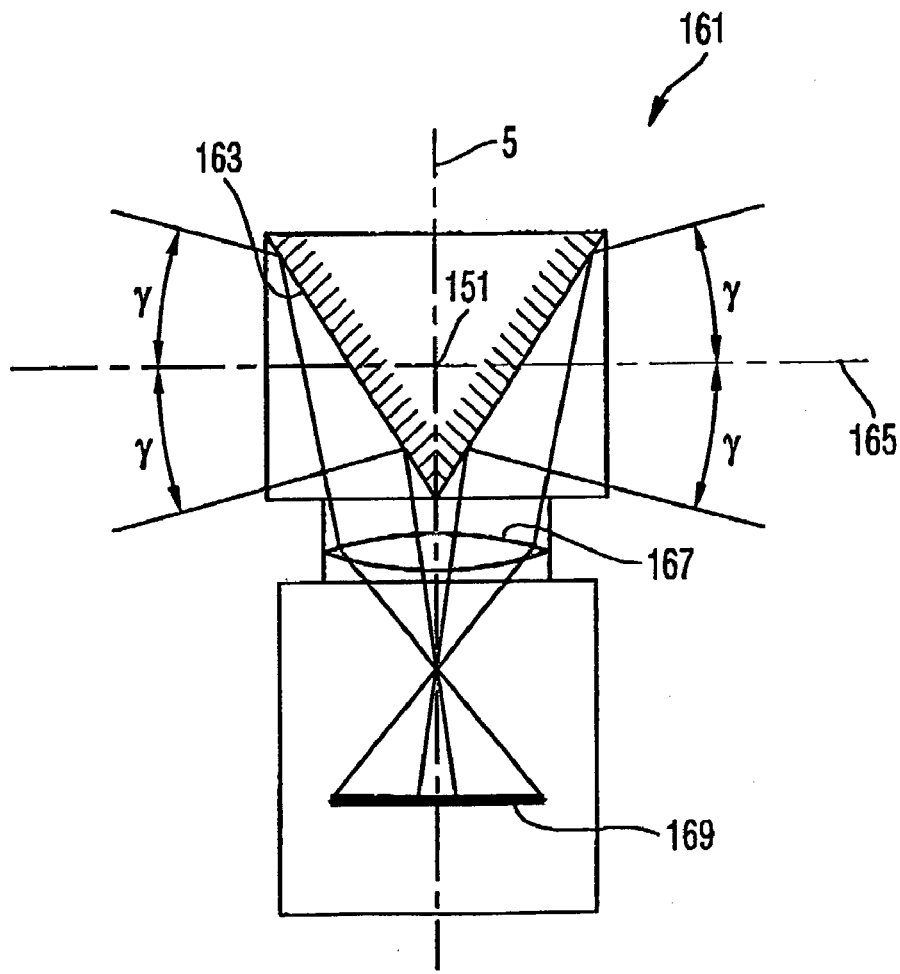
FIG. 20 shows a position detection apparatus for use in the stereo-examination system shown in FIG. 18.

With reference to FIG. 20, the position detection apparatus 161 is disposed symmetrically with respect to the optical axis 5 on the microscope 138. It detects positions of one or more surgeons in the operating room in the polar coordinate system φ, θ having its point of origin at the fixed point 151. The position detection apparatus 161 comprises a conical mirror 163 which reflects radiation impinging on the mirror 163 from an angular range ±γ with respect to a horizontal plane 165 onto an optical system 167 which images said radiation on a CCD chip 169.

The surgeon 135 who carries a light source on his head is locatable in the operating room by the apparatus 161 because his azimuthal position about the axis 5 as well as his elevation with respect to the plane 165 in a range ±γ can be determined by evaluating the image of the CCD chip 169. If several surgeons are present in the operating room, each surgeon may carry a light source, the light intensity of which changes time-dependently, a different characteristic time pattern of the light intensity being provided for each surgeon. By evaluating the image of the camera 169 and taking into consideration the detected time patterns, it is thus possible to determine the positions of the individual surgeons. The image of the camera 169 is evaluated by the controller 49 which changes, corresponding to the detected position of the respective surgeon, the stereobasis 91, 92 of the same in azimuthal direction about the optical axis 5 of the microscope 138.

The controller 49 can also react to changes in the elevation θ of the surgeon in that it shifts the stereobases in parallel, as it has been described with reference to the embodiment shown in FIG. 12.

It is also possible to position the observer remote from the object under observation if, for example, there is only space for a few people at the operating table and further persons, for example, students wish to observe the operation directly "flesh-and-blood". These person can then be positioned outside of the operating room. A fixed point and an orientation of his user coordinate system in space can be determined for each one of these persons so that, when viewing their head-mounted display, they get the impression as if the region of the patient under observation were disposed around this very, namely, their personal fixed point.

Figure 21:
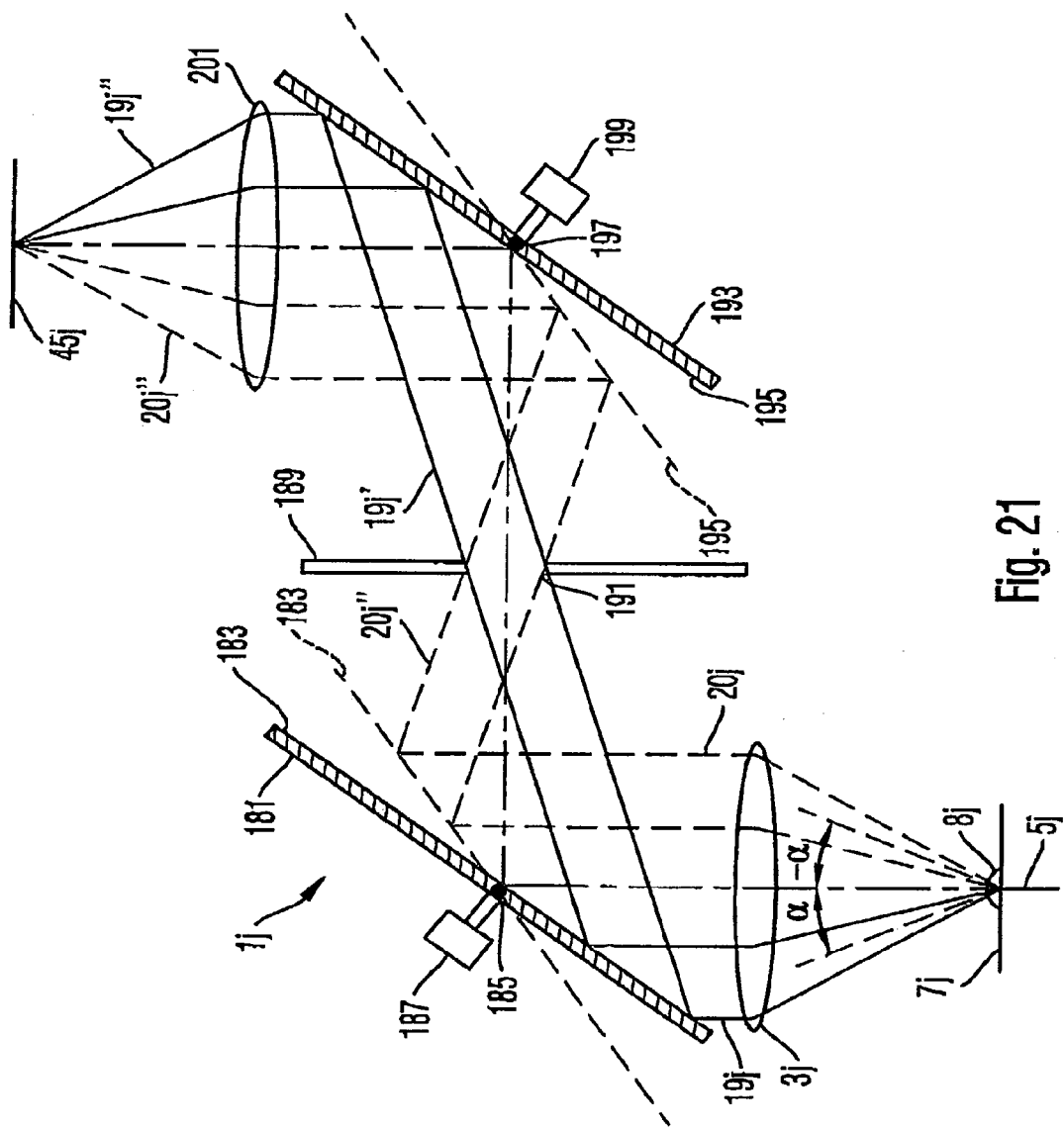
FIG. 21 shows a further embodiment of a stereo-examination system according to the invention.

FIG. 21 is a schematic representation of a further stereo-examination system 1j. Again, it comprises a microscope objective 3j with an optical axis 5j and an object plane 7j for positioning an object. The objective 3j images the object to infinity so that a conic beam bundle emerging from the object plane 7j at the optical axis 5j is converted into a parallel beam bundle. It impinges on a mirror 181 disposed behind the objective 3j, said mirror comprising a mirror surface 183 which intersects the optical axis 5j at a point 185. The mirror 181 is pivotal about this point 185 into two spatial directions, a drive 187 being provided for pivoting the mirror 181.

The radiation reflected at the mirror surface 183 impinges on a stop 189 with a central stop aperture 191.

If the mirror 181 is in the position shown in continuous outline in FIG. 21, the stop aperture 191 is traversed by a partial beam bundle 19j' which is generated from a partial beam bundle 19j after reflection at the mirror surface 183. The partial beam bundle 19j is the partial beam bundle, the central beam of which emanates from the object 8j at an angle α with respect to the optical axis 5j.

The partial beam bundle 19j' impinges on a further mirror 193, the mirror surface 195 of which is disposed symmetrically to the mirror surface 183 of the mirror 181, the mirror surface 195 being pivotal about a point 197 in two spatial directions. The point 197 disposed is symmetrically to the point 185 with respect to the plane of the stop 189. In order to pivot the mirror 193, a drive 199 is provided which is shown merely symbolically in FIG. 21.

After having been reflected at the mirror surface 195, the partial beam bundle 19j' passes through an imaging optical system 201 and impinges as conic partial beam bundle 19j'' on a light-sensitive surface 45j of a camera, the optical imaging system 201 being provided such that the object 8j in the object plane 7j is imaged on the light-sensitive surface 45j.

In the pivot position of the mirrors 181 and 193 shown in FIG. 21, the camera 45j thus records an image of the object 8j viewed at an angle α to the optical axis.

The dotted lines in FIG. 21 show pivot positions of the mirror surfaces 183 and 195 in which a partial beam bundle 20*j* which is different from the partial beam bundle 19*j* images the object 8*j* on the camera 45*j*. A central beam of the partial beam bundle 20*j* is inclined at an angle −α to the optical axis 5*j*.

The drives 187 and 199 are driven by a controller not shown in FIG. 21. By pivoting the mirror surfaces 183 and 195, this controller can thus adjust within an adjustment range arbitrary viewing angles at which the object 8 is imaged on the camera 45*j*. The controller can thus sequentially read an image out of the camera 45*j* at a first viewing angle and then change the position of the mirrors 181 and 193 and read an image out of the camera 45*j* at a second viewing angle. The images taken at the first and the second viewing angles are then supplied to the left eye and the right eye, respectively, of the user, so that he gets a stereoscopic impression of the object 8*j*.

Figure 24:
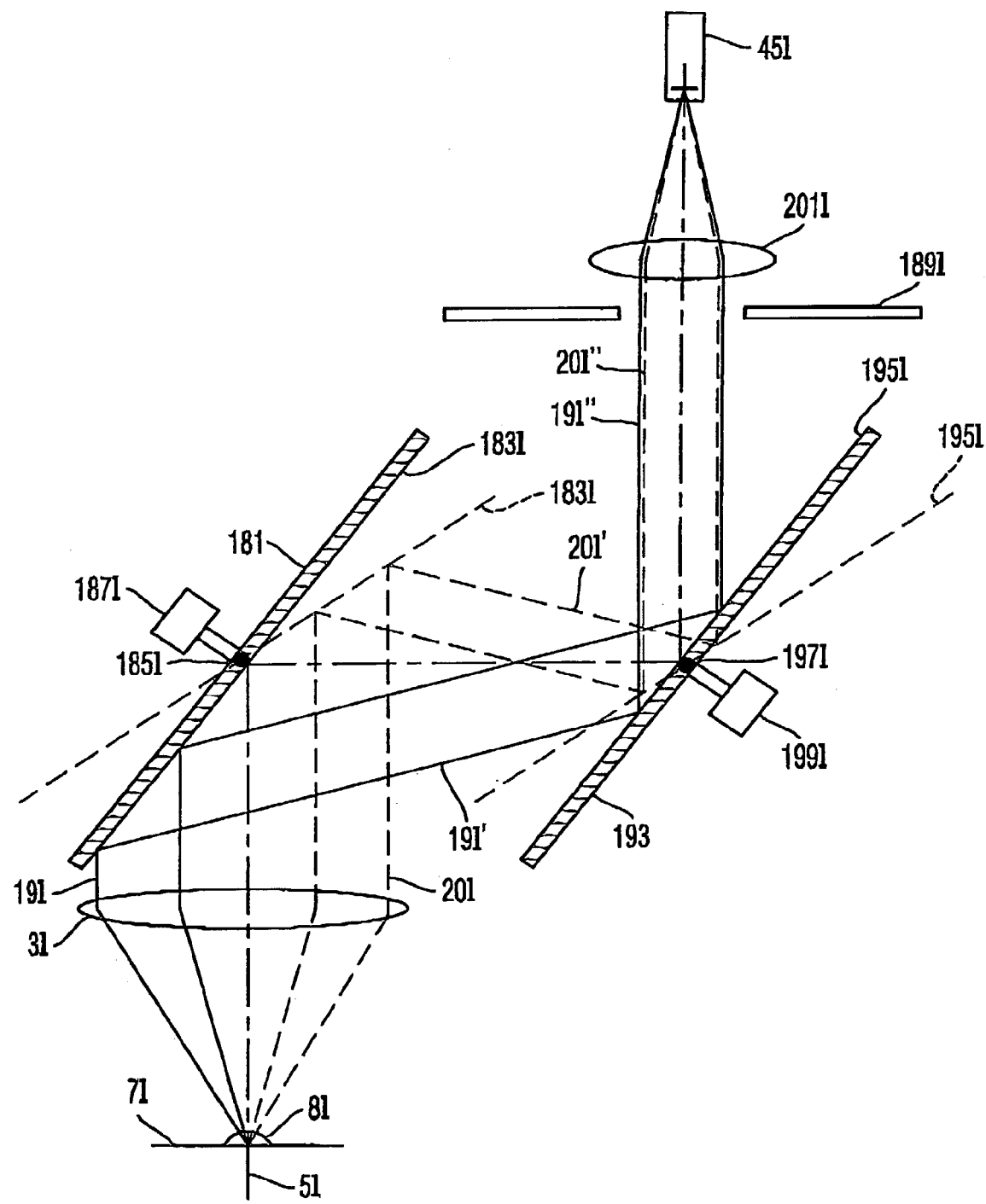

In the variant shown in FIG. 24, the distance and the pivot angles of the pivotal mirrors 181, 193 are adjusted to each other such that the first pivotal mirror 181 always directs the partial beam bundle 19*l*', 20*l*' on a central region of the second pivotal mirror 193, and the second pivotal mirror 193 only images this central region as partial beam bundle 19*l*''', 20*l*''' on the camera 45*l*. To this end, the stop 189 is positioned between the second pivotal mirror 193 and the camera 45*l*.

Figure 25:
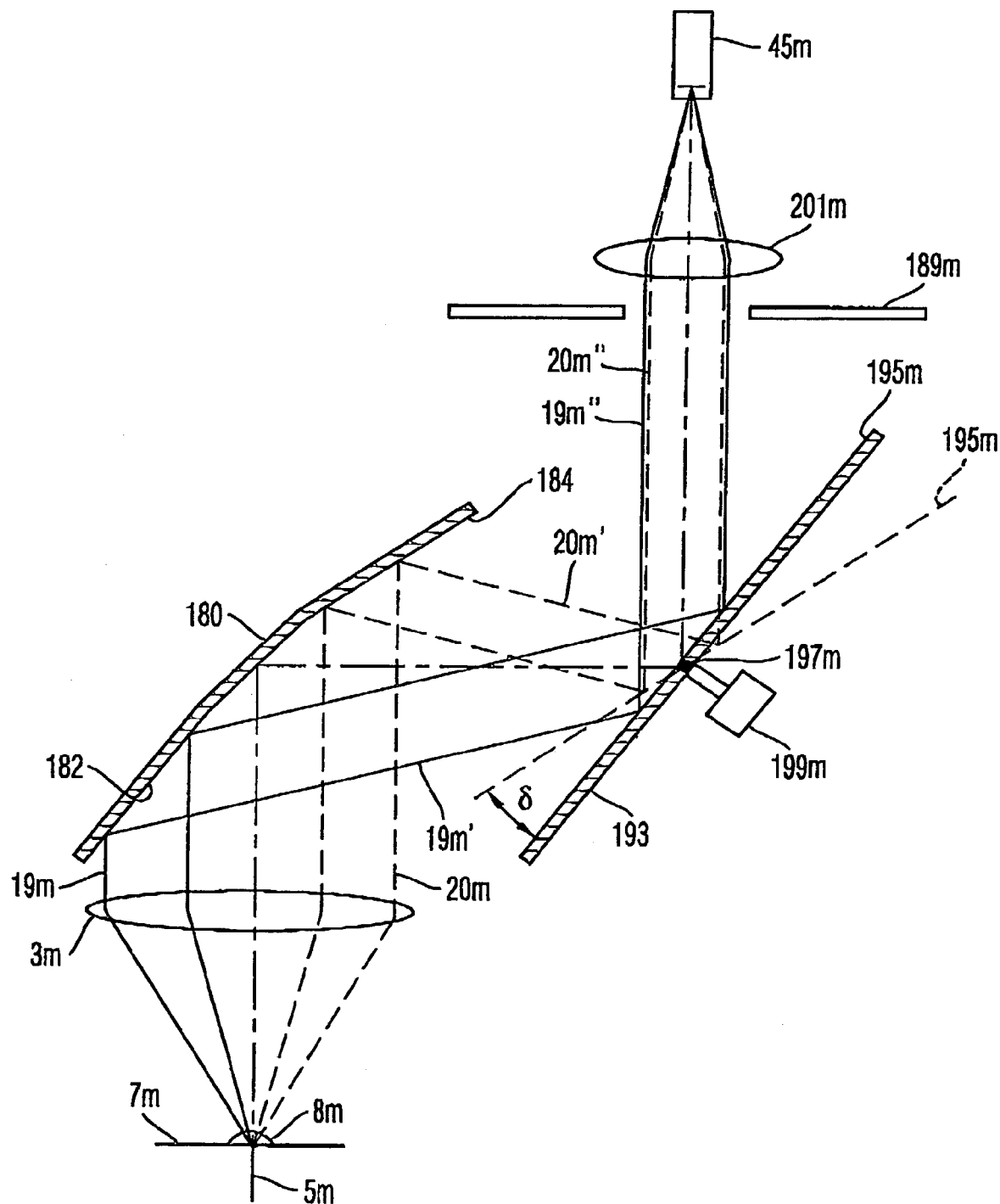

In contrast to the above-described embodiment, in the embodiment shown in FIG. 25, the first pivotal mirror is replaced by a stationary facet mirror 180. The facets 182, 184 of the facet mirror 180 are arranged in pairs inclined at an angle relative to each other which corresponds to the pivot angle δ of the pivotal mirror 193.

As a result, partial beam bundles 19*m*', 20*m*' are always directed from every mirror facet 182, 184 to the second mirror 193 provided as pivotal mirror which, depending on its pivotal position, selects one partial beam bundle from said plurality of partial beam bundles 19*m*', 20*m*' and reflects the selected partial beam bundle 19*m*'' and 20*m*'', respectively, in the direction of the camera 45*m*, while the other partial beam bundles 20*m*'' and 19*m*'', respectively, are absorbed by the stop 189*m*.

Figure 26:
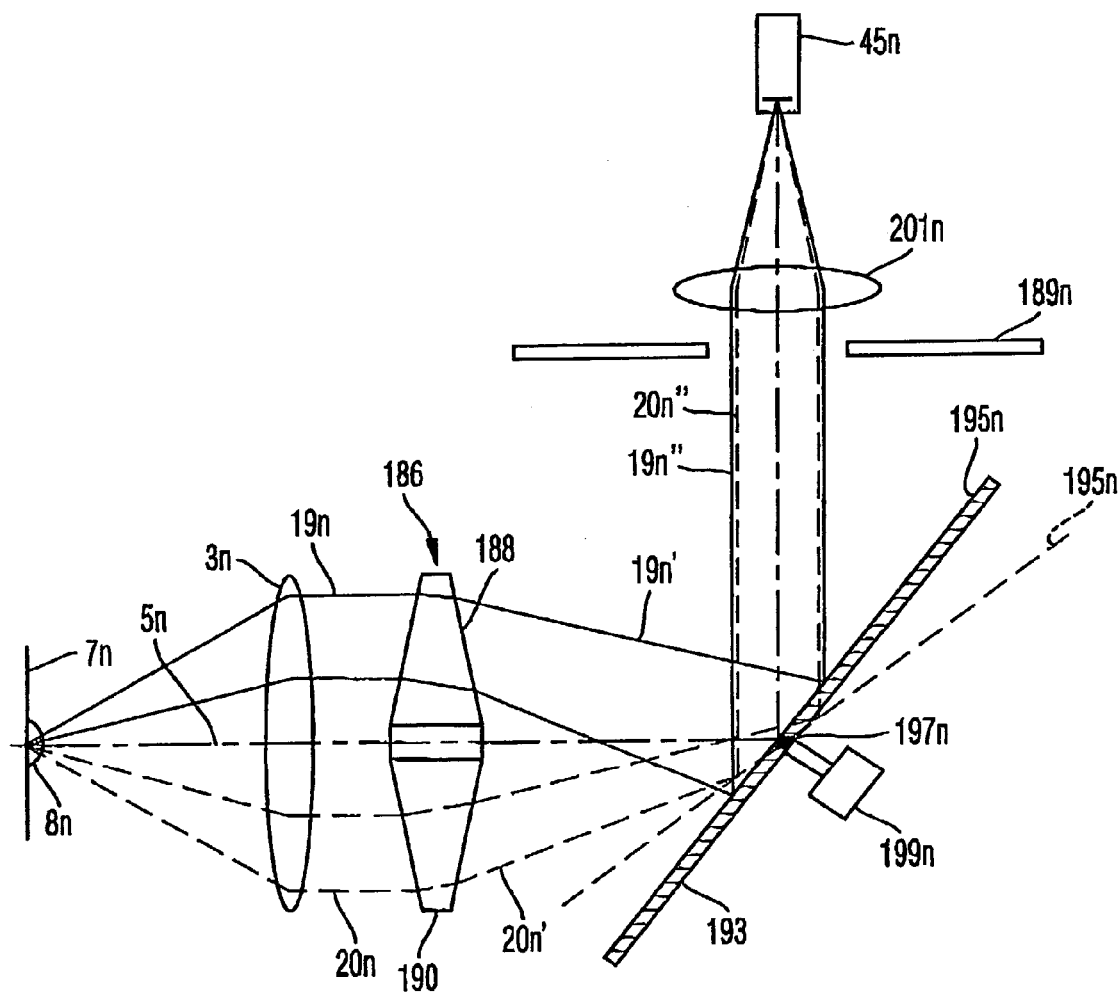

A further variant of the above-described embodiment is illustrated in FIG. 26. Instead of the facet mirror, this embodiment comprises a prism arrangement 186 disposed in beam direction behind the objective. The prism arrangement 186 consists of a ring of individual prisms 188, 190 each of which deflects a partial beam bundle 19*n*', 20*n*' in axial direction. On the optical axis 5*n*, there is again disposed a pivotal mirror 193*n* which directs, in its different pivot positions, one of the partial beam bundles 19*n*'' into the direction of the camera 45*n*, while the partial beam bundles 20*n*'' are absorbed by the stop 189*n* positioned between the mirror 193*n* and camera 54*n*.

Figure 27:
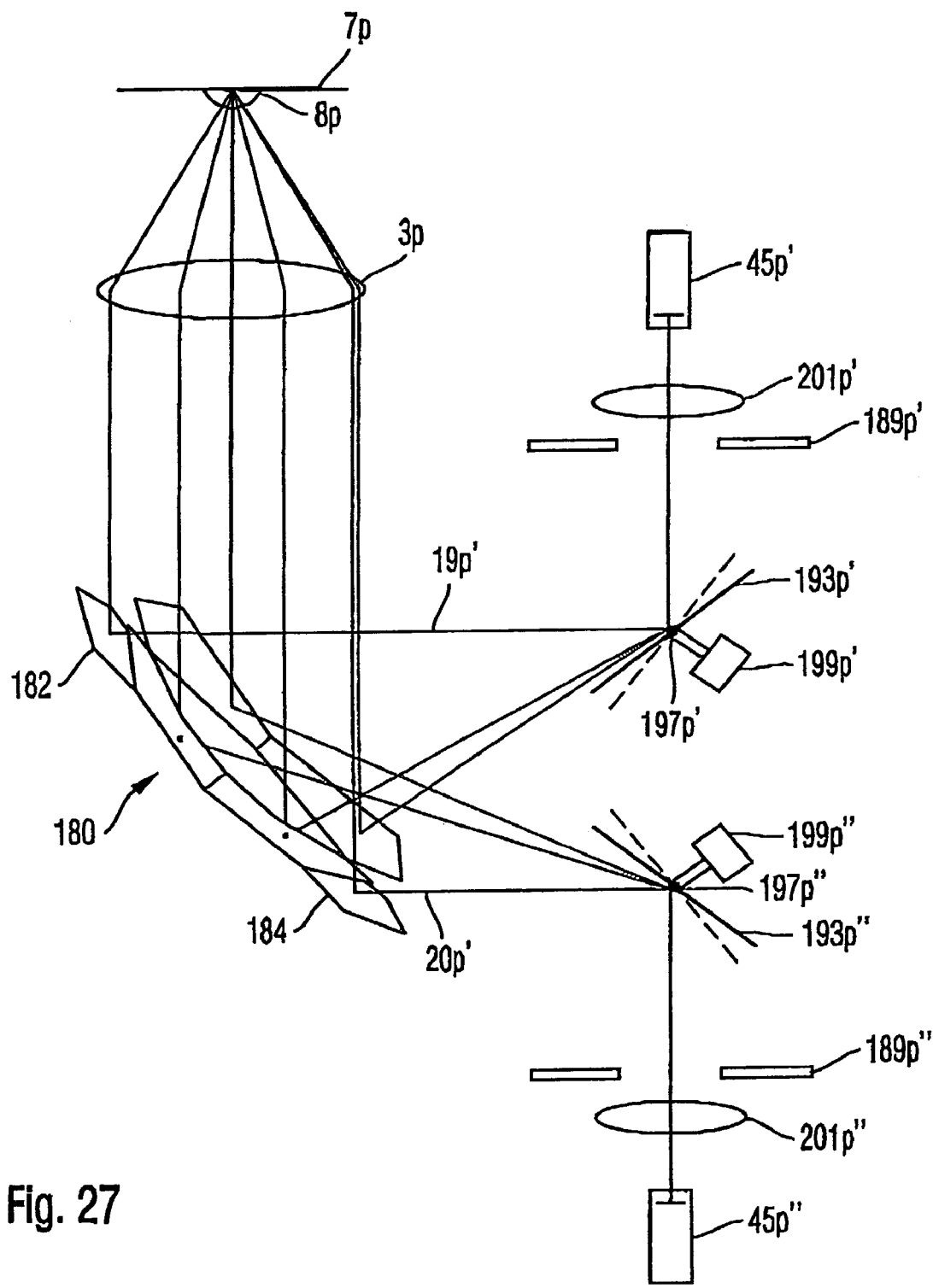

Further, FIG. 27 shows a variant of the two above-described embodiments, wherein, instead of the one pivotal mirror 193*n* and the one camera 45*n*, there are disposed two of the kind. Here, the facets 182, 184 of the facet mirror 180 (or, in a variant not shown, the prisms of a prism arrangement) are provided such that facets 182, 184 (or prisms) disposed opposite each other, each direct their partial beam bundle 19*p*' and 20*p*', respectively, to different pivotal mirrors 193*p*', 193*p*'' and thus to different cameras 45*p*', 45*p*''. Each of the two pivotal mirrors 193*p*', 193*p*'' selects, according to its pivotal position, a partial beam bundle 19*p*' and 20*p*' from the facets 182 and 184 (or prisms) respectively allocated thereto so that each of the cameras 45*p*', 45*p*'' always receives a partial beam bundle 19*p*', 20*p*' for generating corresponding representations. The facets 182, 184 allocated to the two pivotal mirrors 193*p*', 193*p*'' are, moreover, positioned in alternate configuration in circumferential direction of the facet mirror 180. The variant shown in FIG. 27 comprises a facet mirror with 6 pentagonal facets which are disposed about a central hexagon. The four of the six facets which do not lie in the plane of the three mirror centers are each slightly bent upwards towards the center. The other two opposed facets lie approximately in a plane with the central hexagon. Each one of these flatly disposed facets is allocated, together with the two diagonally opposite, upwardly bent facets, to one pivotal mirror 193*p*', 193*p*'', respectively. These pivotal mirrors 193*p*' and 193*p*'' each select, depending on the pivotal position, one of three facets and reflect the respective partial beam bundle 19', 20' in the direction of the camera 45*p*' and 45*p*'' respectively allocated thereto.

In a further variant, not shown, the two individual movable pivotal mirrors 193*p*', 193*p*'' are replaced by a single rotatable polyeder mirror in the form of an irregular truncated pyramid. Depending on the rotational position, said truncated pyramid provides two opposite mirror surfaces in the plane of the optical axis, each of which directs one of the two selected partial beam bundles to a camera.

In FIGS. 24 to 27, the respective controllers of the pivotal mirror drives are not shown.

In the embodiments comprising a plurality of cameras, the latter can also by formed by different regions of a light-sensitive elements of a single camera.

Figure 28:
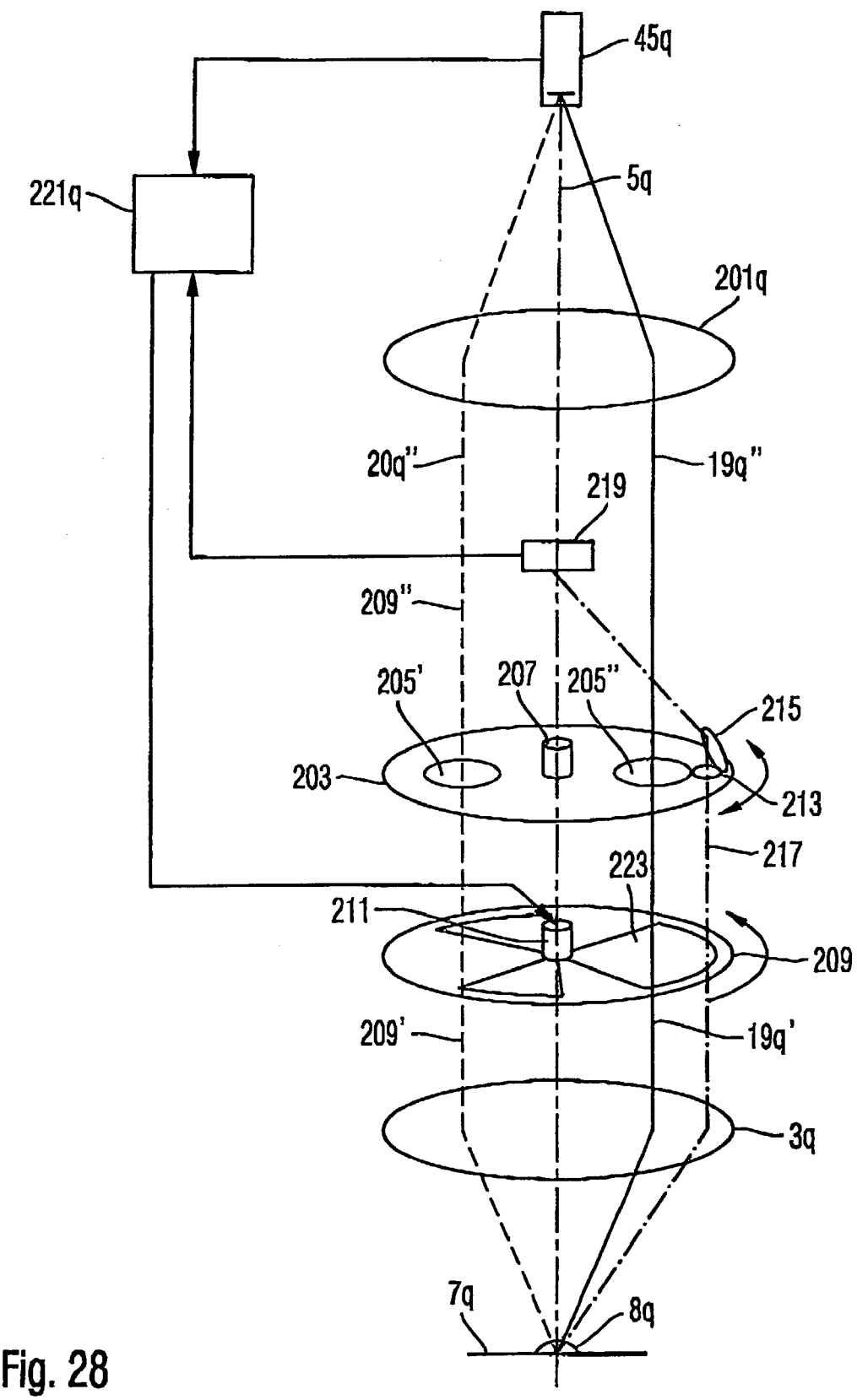

Finally, FIG. 28 shows an embodiment wherein one of the partial beam bundles 19*q*'' and 20*q*'' is fed out by a turnable double stop 203 having two stop apertures 205', 205''. The rotation of the double stop 203 is effected by a drive 207 which is controlled by a controller 221. Moreover, this embodiment comprises a rotating chopper wheel 209 with an uneven number of open sectors 223, here shown with three sectors. The chopper wheel 209 is driven by the drive 211 which is likewise controlled by the controller 221. By rotation of the chopper wheel 209, the two stop apertures 205', 205'' alternately overlap with the open sectors 223 of the chopper wheel 209. As a result, one of the partial beam bundles 19*q*' and 20*q*' is alternately supplied to the camera 45*q* and detected there so that the camera 45*q* alternately receives images of a region 8*q* of the object 7*q*.

In order for the camera 45*q* being maintained in correct synchronization when the double stop 203 is rotated, a marking hole 213 is furthermore provided in the double stop 203. A reference beam bundle 217 emanating from the object 7*q* passes through said hole, provided that an open sector of the chopper wheel 209 is currently in a corresponding angular position, impinges on the deflecting mirror 215 connected to the double stop 203 and is detected by the photo diode 219 disposed on the optical axis 5*q*.

Accordingly, the output signal of the photo diode 219 is modulated with a frequency which is dependent upon the rotational speed and the number of sectors of the chopper wheel 209, the phase of said modulation being dependent upon the difference between the phases of the chopper wheel 209 and the double stop 203. The output signal of the photo diode 219 is supplied to the controller 221, and the controller 221 controls the drive 211 of the chopper wheel 209 such that a constant modulation phase is maintained. As a result, the camera is correctly synchronized with the chopper wheel 209 in every rotational position of the double stop 203 and thus provides a correctly alternating image sequence.

A further variant of a selection arrangement for selecting different partial beam bundles to image the object on a camera can be provided by a stop which is rotatable about an axis and comprises a decentral stop aperture. The rotational axis of the stop coincides with the optical axis of a microscope objective and, by rotating the stop about the optical axis, an azimuth angle of the partial beam bundle can then be selected which is imaged on a camera. As a result, a first camera image of the object can be recorded in a first rotational position of the stop about the optical axis, and a second camera image can be recorded in a different rotational position of the stop about the optical axis. The two camera images are then supplied to the left eye and the right eye, respectively, of the observer so that he gets a stereoscopic impression of the object.

Figure 29:
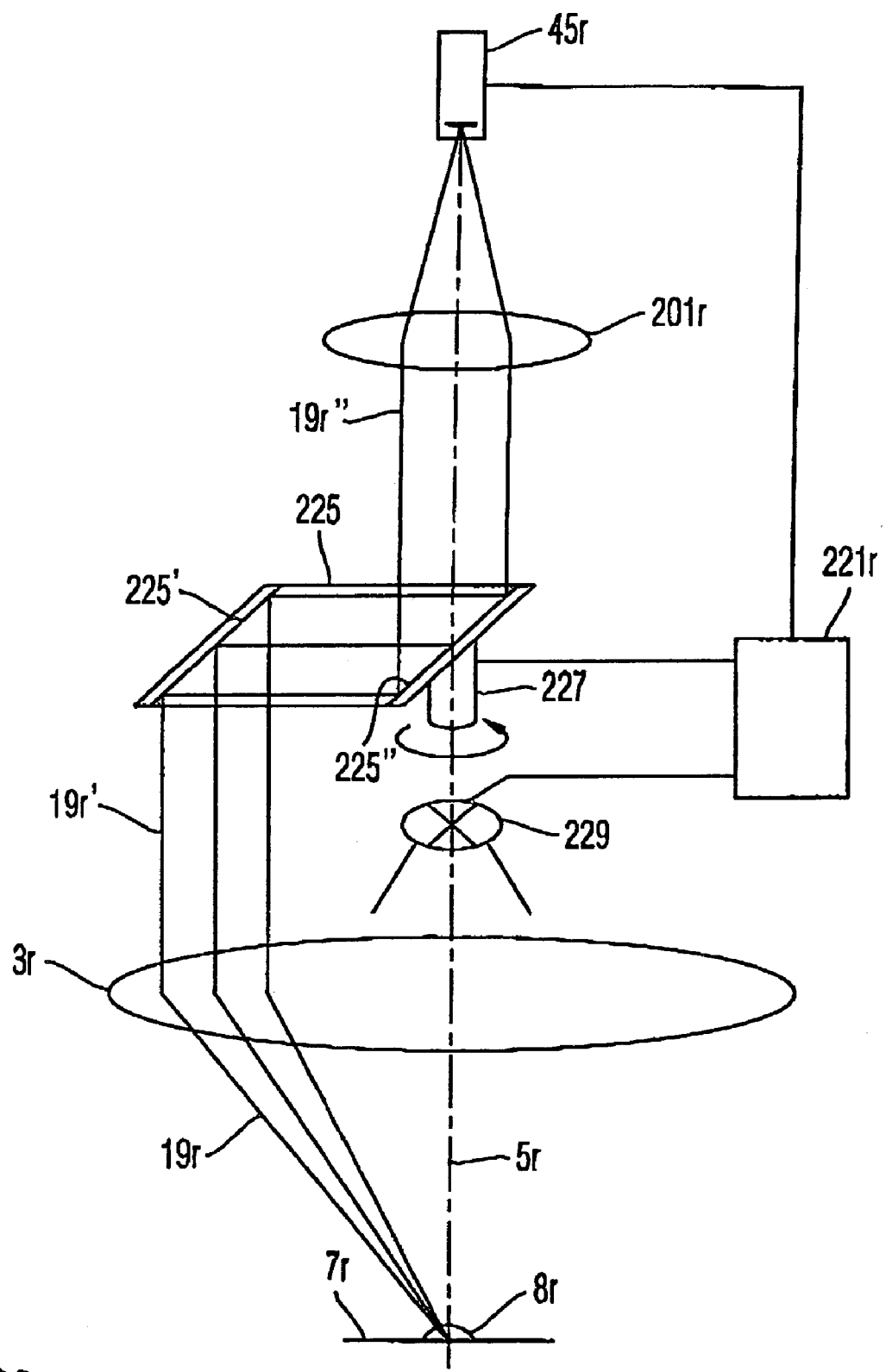

A similar embodiment of the stereo-examination system is shown in FIG. 29. Here, a mirror prism 225, driven by a drive 227, rotates about a rotational axis which coincides with the optical axis 5r. As a result, the prism 225 always feeds with mirror surfaces 225' and 225" another partial beam bundle 19r' out of the object-side beam bundle and passes it on to the camera 45r. The selection of specific partial beam bundles 19r" is effected here by a pulsed light source 229, the timing of which can be controlled by the observer by means of the controller 221r. For example, a stroboscope lamp arrangement is provided as controllable pulsed light source 229. The lamp arrangement 229 is caused to effect a flash sequence of double the prism rotary frequency for each observer; the camera images corresponding to a flash sequence are alternately allocated to the two stereo-images for the respective observer. The phase position between the different flash sequences determines the angular difference between the stereobases for the observers.

Figure 30:
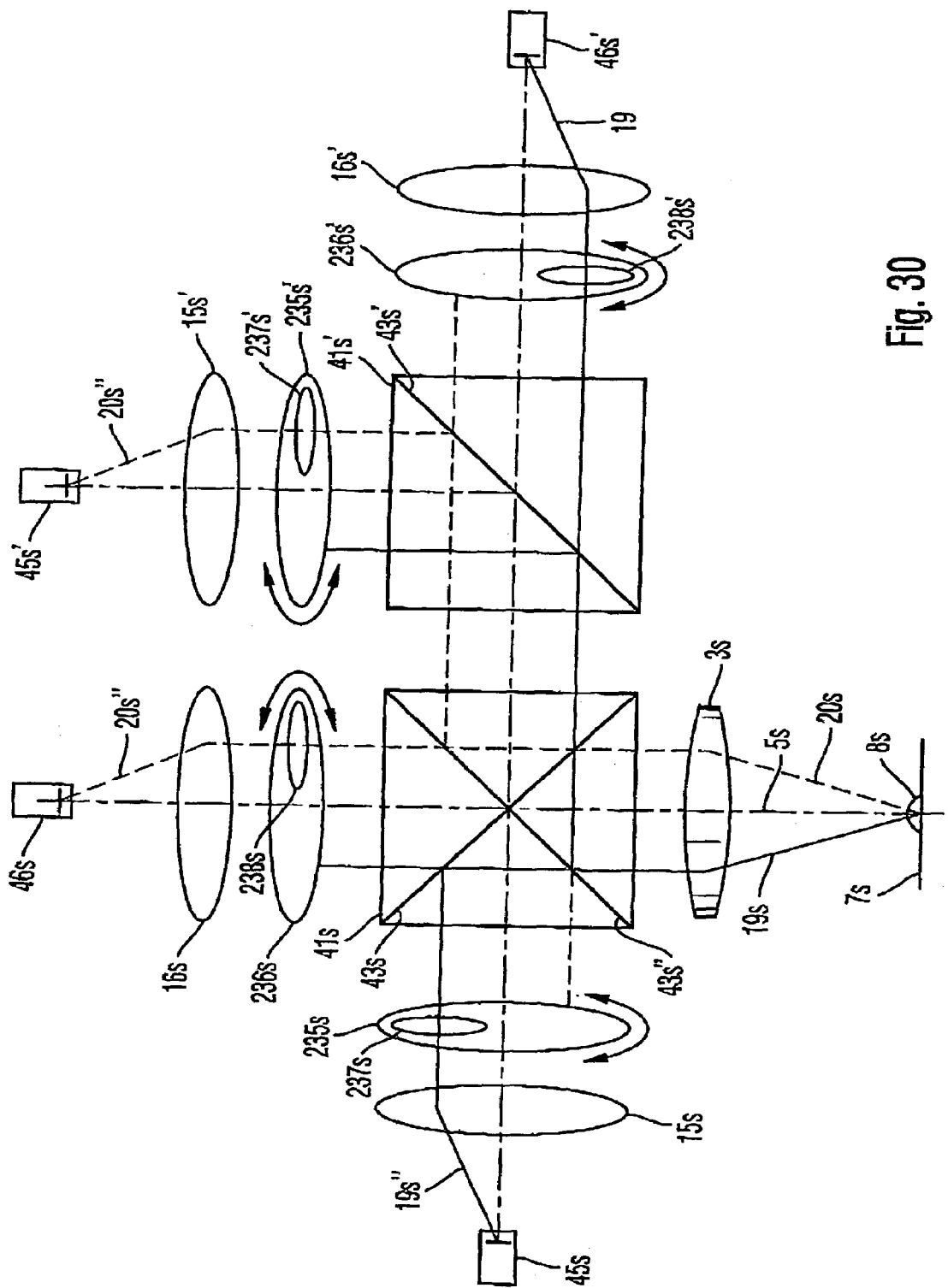

As against this, FIG. 30 shows an embodiment wherein a camera 45s, 46s, 45s', 46s" is allocated to each one of the two eyes of two observers. The selection of the appertaining partial beam bundles is effected here by dividing the beam bundle up between the two observes by the cross beam divider 41s; the latter furthermore causes the beam bundle to be divided into the two partial beam bundles for the two eyes of the first observer. The division of the other beam portion for the two eyes of the second observer is effected by the beam divider 41s'. Each one of the four cameras 45s, 46s, 45s', 46s' is associated with a stop 235s, 236s, 235s', 236s' which is rotatable about the optical axis 4s and has a selection region 237s, 238s, 237s', 238s', respectively. The stops 235s, 236s and 235s', 236s' respectively allocated to an observer are each coupled such that they allow oppositely disposed partial beam bundles 19s and 20s to pass therethrough. The rotational positions of the stops 235s, 235s' and 236s, 236s' respectively allocated to different observers, however, are freely selectable. The camera optics 15s, 16s, 15s' and 16s' focus the partial beam bundles 19s" and 20s" respectively fed out. Each one of the observers can adjust the pair of stops 235s, 236s and 235s', 236s' respectively allocated to the same by means of a controller, not shown, such that the desired stereoscopic representation of the object 8s is made available to him.

Figures 22, 23:
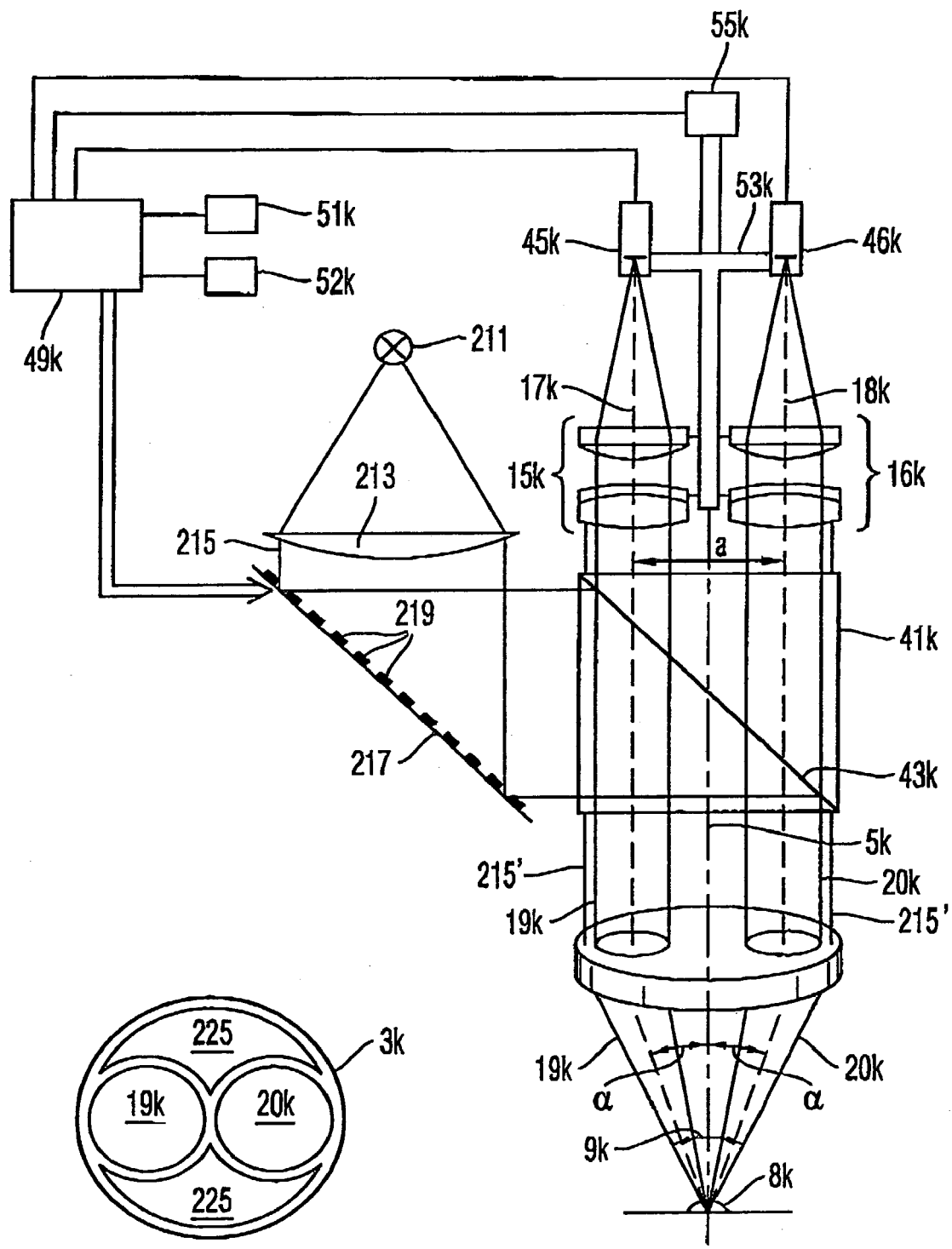
FIG. 22 shows an illumination system for use in a stereo-examination system shown in FIGS. 1 to 19.
FIG. 23 is a cross-sectional view for illustrating the function of the illumination system shown in FIG. 22, FIGS. 24 to 30 show further embodiments of a stereo-examination system according to the invention.

FIG. 22 shows, by way of example, an advantageous embodiment of an illumination for a stereo-examination system of the invention on the basis of an embodiment which is similar to the embodiment shown in FIG. 3. Light from a light source 211 is shaped by an optical system 231 to form a parallel beam 215 which impinges on a field 217 of symbolically represented micromirrors 219. The micromirrors 219 are controllable by a controller 49k which likewise causes cameras 45k and 46 to rotate about an optical axis 5k of an objective 3k to supply a stereoscopic representation of an object 8k positioned in the object plane 7k of the objective 3k to a left eye and a right eye of a user via displays 51k, 52k. To this end, the camera 45k feeds a partial beam bundle 19k out of the complete beam bundle which emanates from the object 8k inclined at an angle α to the optical axis 5k and is further processed by the objective 3k. Equally, the other camera 46k feeds out a corresponding partial beam bundle 20k which is inclined at an angle −α to the optical axis 5k.

The micromirrors 219 are selectively switchable by the controller 49k from a first switching state to a second switching state. In the first switching state, they reflect the light of the light source 211 contained in the parallel beam 215 through 90° so that it is fed into the beam path of the microscope via a mirror surface 43k of a beam divider 41k and focussed onto the object 8k via the objective 3k. In the second switching state, the micromirrors 219 each reflect the light of the beam 215 such that the beam is not fed into the beam path of the microscope and, accordingly, the radiation of the lamp 211 does not reach the object 8k.

The controller 49k controls the micromirrors 219 such that not the light of the entire cross-section of the beam 125 is used for illuminating the object 8k. This is illustrated in further detail with reference to FIG. 23 which shows a cross-section through the objective 3k and an arrangement of the cross-sections of the partial beam bundle 19k and 20k in the plane of the objective 3k. The cross-sections of the partial beam bundles 19k and 20k occupy only a portion of the entire cross-section of the objective 3k. Those regions of the objective 3k which are disposed outside of the cross-sections of the partial beam bundles 19k and 20k are occupied by regions 225 which are traversed by the radiation used to illuminate the object 8k. This is achieved by appropriately controlling the micromirros 219. In the regions disposed outside of the regions 225 of the cross-section of the objective 3k, no radiation of the light source 211 passes through the objective 3k. By this spatial separation of the cross-sectional regions of the objective 3k used for the illumination of the object 8k and the imagining of the same, disturbing reflections caused by the illumination in the images of the object 8k recorded by the cameras 45k and 46k are eliminated.

The beam guidance for the illumination illustrated with reference to FIGS. 22 and 23 can be applied to any other of the above-described examination systems to reduce reflections caused by the illumination radiation in the recorded images.

A variant of the stereo-examination system shown in FIGS. 4 and 5 can reside in that, instead of the cameras 45a, 46a and 45a', 46a', respectively, oculars are provided for direct observation by two observers. The observers then do not view the imaged object via separate displays, such as viewing screens, but in a similar way as described with reference to the conventional stereomicroscope shown in FIG. 2. However, an accordingly modified stereo-examination system is advantageous in so far as each observer can rotate his pair of oculars freely about the optical axis and thus is no longer obstructed by the fixed arrangement in circumferential direction about the optical axis as it is the case with the conventional stereomicroscope shown in FIG. 2.

In this respect, it is possible to provide separate zoom systems in a beam path between the respective beam divider and the oculars so that each observer can select his own zoom position. The objective can then be an objective with variable working distance.

In the embodiment described above with reference to FIGS. 18 and 19, the fixed point 151 for the user coordinate system lies on the optical axis. This is appropriate if the user is to perform directly manipulations on the object 133 under observation, as it applies to the case of the surgeon 135 in the operating room as shown in FIG. 18.

However, it is also possible for the user to be positioned remote from the object under observation so that the fixed point of the user coordinate system does not coincide with the region of the object under observation. An example for such an application would be a telesurgical method wherein the surgeon is positioned distant from the patient and performs the operation on the patient by means of a remote-controlled robot. In this case, an image is defined between an azimuth of the user in the user coordinate system and an azimuth of the stereobasis about the optical axis of the microscope is defined. By moving the head, the user can then likewise obtain impressions of the object under observation from different perspectives.

The invention claimed is:

1. A stereo-examination system comprising:
an objective arrangement having an optical axis and an object plane, wherein the objective arrangement is configured to receive an object-side beam bundle emanating from the object plane into a solid angle region and to convert the object-side beam bundle into an image-side beam bundle;
a selection arrangement for selecting a first pair and a second pair of partial beam bundles from the image-side beam bundle, wherein the selection arrangement is configured to displace a beam cross-section of at least one partial beam bundle of the first pair and the second pair of partial beam bundles relative to a beam cross-section of the image-side beam bundle;
an image transmission apparatus for generating representations of images provided by the first pair and the second pair of partial beam bundles;
an imaging optical system conflaured to transmit the image-side beam bundle to the image transmission apparatus; and
a controller configured to control the selection arrangement to displace the beam cross-section of the at least one partial beam bundle in a circumferential direction about the optical axis.

2. The stereo-examination system according to claim 1, wherein the selection arrangement is further configured to selectively select one of only a first partial beam bundle and only a second partial beam bundle of the first pair and the second pair of partial beam bundles from the image-side beam bundle.

3. The stereo-examination system according to claim 2, wherein the selection arrangement comprises a switchable beam stop disposed in the beam cross-section of the image-side beam bundle, said beam stop selectively transmitting one of the first partial beam bundle and the second partial beam bundle.

4. The stereo-examination system according to claim 3, wherein the switchable beam stop comprises a plurality of separately controllable beam stop elements which are switchable from a state in which they transmit light to a state in which they substantially transmit no light.

5. The stereo-examination system according to claim 4, wherein the beam stop elements comprise liquid crystals.

6. The stereo-examination system according to claim 4, wherein the stop elements comprise mechanically displaceable stop elements.

7. The stereo-examination system according to claim 2, wherein the selection arrangement comprises a switchable mirror disposed in the beam cross-section of the image-side beam bundle which selectively reflects the first partial beam bundle or the second partial beam bundle.

8. The stereo-examination system according to claim 7, wherein the switchable mirror comprises a plurality of separately controllable mirror elements which are switchable from a state in which they reflect light of the image-side beam bundle to the image transmission apparatus to a state in which they do not reflect said light to the image transmission apparatus.

9. The stereo-examination system according to claim 8, wherein the mirror elements comprise liquid crystals.

10. The stereo-examination system according to claim 8, wherein the mirror elements comprise mechanically displaceable mirror elements.

11. The stereo-examination system according to claim 2, wherein the selection arrangement comprises a stop fixedly positioned in the beam cross-section of the image-side beam bundle and at least one controllable beam divider for selectively directing the first partial beam bundle or the second partial beam bundle through the stop.

12. The stereo-examination system according to claim 2, wherein the image transmission apparatus comprises a camera, and wherein the controller is further configured to control the camera and the selection arrangement such that the camera generates, successively in time, at least one representation of the image provided by the first partial beam bundle and at least one representation of the image provided by the second partial beam bundle.

13. The stereo-examination system according to claim 1, wherein the selection arrangement comprises a rotatable stop having two apertures for feeding-out of the two partial beam bundles and a rotatable chopper wheel comprising at least one light-impermeable region and at least one light-permeable region for blocking out one of the fed-out partial beam bundles.

14. The stereo-examination system according to claim 1, wherein the objective arrangement is configured to image the object plane to infinity.

15. The stereo-examination system according to claim 1, wherein the objective arrangement images the object plane to finity, and the selection arrangement is disposed in a pupil plane of image-side beam bundle.

16. The stereo-examination system according to claim 1, wherein the selection arrangement is disposed in a plane of the image-side beam bundle which is conjugated with respect to the object plane.

17. The stereo-examination system according claim 1, wherein the image transmission apparatus comprises a display apparatus configured to represent the image provided by the first partial beam bundle such that it is visible for a left eye of the user, and to represent the image provided by the second partial beam bundle such that it is visible for a right eye of the user.

18. The stereo-examination system according to claim 17, wherein images provided by the first and second partial beam bundles are displayed such that they are rotated in their image planes.

19. The stereo-examination system according to claim 17, further comprising a position detection device for detecting at least one azimuth of a position of the user relative to the objective arrangement and for providing an azimuth signal which is representative of the azimuth, and wherein the controller is configured to adjust the displacement of the at least one partial beam bundle in dependence of the azimuth signal.

20. The stereo-examination system according to claim 19, wherein the image transmission apparatus is configured to display the images to be rotated in their image planes about an image rotation angle which is dependent on the azimuth signal.

21. A stereo-examination system, comprising:

an objective arrangement having an optical axis and an object plane, wherein the objective arrangement is configured to receive an object-side beam bundle emanating from the object plane into a solid angle region and to convert the object-side beam bundle into an image-side beam bundle;

a selection arrangement for selecting at least one pair of partial beam bundles from the image-side beam bundle, wherein the selection arrangement is configured to displace a beam cross-section of at least one partial beam bundle of the at least one pair of partial beam bundles relative to a beam cross-section of the image-side beam bundle;

an image transmission apparatus for generating representations of images provided by the at least one pair of partial beam bundles; and a controller configured to control the selection arrangement to displace the beam cross-section of the at least one partial beam bundle in a circumferential direction about the optical axis, wherein the controller is further configured to control the selection arrangement such that the selection arrangement selects at least two pairs of partial beam bundles from the image-side beam bundle, wherein the image transmission apparatus comprises a camera, and wherein the controller is furthermore configured to control the camera and the selection arrangement such that the camera generates, successively in time, at least one representation of the image produced by each partial beam bundle of the at least two pairs of partial beam bundles.

\* \* \* \* \*

UNITED STATES PATENT AND TRADEMARK OFFICE
CERTIFICATE OF CORRECTION

| | | |
|---|---|---|
| PATENT NO. | : 7,180,660 B2 | Page 1 of 1 |
| APPLICATION NO. | : 10/357260 | |
| DATED | : February 20, 2007 | |
| INVENTOR(S) | : Hauger et al. | |

It is certified that error appears in the above-identified patent and that said Letters Patent is hereby corrected as shown below:

In the Claims:

In Claim 1, column 21 (Line 36), replace "conflaured" with --configured--.

In Column 10, line 54, replace "if" with --1f--.

In Column 11, line 13, replace "kcontained" with --contained--.

In Column 14, line 40, replace "ii" with --1i--.

Signed and Sealed this

Seventeenth Day of July, 2007

JON W. DUDAS
*Director of the United States Patent and Trademark Office*